United States Patent
Jain et al.

(10) Patent No.: US 12,012,365 B2
(45) Date of Patent: Jun. 18, 2024

(54) MITIGATION OF CORROSION IN CARBONATED CONCRETE BASED ON LOW-CALCIUM SILICATE CEMENT

(71) Applicant: Solidia Technologies, Inc., Piscataway, NJ (US)

(72) Inventors: Jitendra Jain, Edison, NJ (US); Anuj Seth, East Brunswick, NJ (US); Vahit Atakan, Princeton, NJ (US); Ahmet Cuneyt Tas, Piscataway, NJ (US); Sadananda Sahu, Tallahassee, FL (US)

(73) Assignee: SOLIDIA TECHNOLOGIES, LTD., San Antonio, TX (US)

( * ) Notice: Subject to any disclaimer, the term of this patent is extended or adjusted under 35 U.S.C. 154(b) by 1236 days.

(21) Appl. No.: 16/283,460

(22) Filed: Feb. 22, 2019

(65) Prior Publication Data
US 2019/0256415 A1    Aug. 22, 2019

Related U.S. Application Data

(60) Provisional application No. 62/634,035, filed on Feb. 22, 2018.

(51) Int. Cl.
| | | |
|---|---|---|
| C04B 14/04 | (2006.01) | |
| C04B 7/02 | (2006.01) | |
| C04B 14/30 | (2006.01) | |
| C04B 14/34 | (2006.01) | |
| C04B 28/02 | (2006.01) | |
| C04B 28/08 | (2006.01) | |
| C04B 40/00 | (2006.01) | |
| C04B 40/02 | (2006.01) | |
| C04B 28/18 | (2006.01) | |
| C04B 103/00 | (2006.01) | |
| C04B 103/61 | (2006.01) | |
| C04B 103/65 | (2006.01) | |
| C04B 111/00 | (2006.01) | |
| C04B 111/26 | (2006.01) | |

(52) U.S. Cl.
CPC .............. *C04B 7/02* (2013.01); *C04B 14/043* (2013.01); *C04B 14/304* (2013.01); *C04B 14/34* (2013.01); *C04B 28/021* (2013.01); *C04B 28/082* (2013.01); *C04B 40/006* (2013.01); *C04B 40/0231* (2013.01); *C04B 28/188* (2013.01); *C04B 2103/0014* (2013.01); *C04B 2103/61* (2013.01); *C04B 2103/65* (2013.01); *C04B 2111/00517* (2013.01); *C04B 2111/26* (2013.01); *C04B 2201/52* (2013.01); *Y02P 40/18* (2015.11); *Y02W 30/91* (2015.05)

(58) Field of Classification Search
CPC ....... C04B 7/02; C04B 14/043; C04B 14/304; C04B 14/34; C04B 28/021; C04B 28/082; C04B 40/006; C04B 40/0231; C04B 28/188; C04B 2103/0014; C04B 2103/61; C04B 2103/65; C04B 2111/00517; C04B 2111/26; C04B 2201/52; C04B 14/04; C04B 14/30; C04B 28/02; C04B 28/08; C04B 40/00; C04B 40/02; C04B 12/04; C04B 18/141; C04B 18/167; C04B 22/062; C04B 22/064; C04B 22/085; C04B 22/106; C04B 32/02; C04B 2103/22; C04B 2103/302; C04B 2103/304; C04B 14/22; C04B 14/28; C04B 18/08; C04B 18/146; C04B 22/06; Y02P 40/18; Y02W 30/91
See application file for complete search history.

(56) References Cited

U.S. PATENT DOCUMENTS

| | | | |
|---|---|---|---|
| 9,868,667 B2 | 1/2018 | Riman et al. | |
| 2014/0263683 A1 | 9/2014 | Krishnan et al. | |
| 2014/0272216 A1 | 9/2014 | Deo et al. | |
| 2016/0168720 A1* | 6/2016 | Jain .................. | C22C 47/04 |
| | | | 148/287 |
| 2016/0272545 A1* | 9/2016 | Atakan ............... | C04B 28/188 |
| 2016/0340261 A1 | 11/2016 | Atakan et al. | |
| 2017/0204010 A1* | 7/2017 | Atakan ............... | C04B 12/005 |
| 2018/0273430 A1 | 9/2018 | Tas et al. | |

FOREIGN PATENT DOCUMENTS

| | | | |
|---|---|---|---|
| FR | 3 051 461 A1 | | 11/2017 |
| JP | 2016034893 A | * | 3/2016 |
| WO | 2009/132692 A1 | | 11/2009 |
| WO | 2015/051243 A2 | | 4/2015 |

OTHER PUBLICATIONS

JP-2016034893-A, machine translation (Year: 2016).*

* cited by examiner

*Primary Examiner* — Bryan D. Ripa
*Assistant Examiner* — Marites A Guino-O Uzzle
(74) *Attorney, Agent, or Firm* — BRYAN CAVE LEIGHTON PAISNER LLP

(57) ABSTRACT

The invention provides methods and compositions that prevent, mitigate or delay the onset of corrosion of iron or steel (e.g., plain carbon steel) components used as reinforcement or otherwise at least partially embedded in carbonated concrete composite materials and objects based on carbonatable calcium silicate cement.

16 Claims, 20 Drawing Sheets

MITIGATION OF CORROSION IN CARBONATED CONCRETE BASED ON LOW-CALCIUM SILICATE CEMENT

FIELD

The invention generally relates to composite materials.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Concrete is omnipresent. Our homes likely rest on it, our infrastructure is built from it, as are most of our workplaces. Conventional concrete is made by mixing water and aggregates such as sand and crushed stone with ordinary portland cement (OPC), a synthetic material made by burning a mixture of ground limestone and clay, or materials of similar composition in a rotary kiln at a sintering temperature of around 1,450° C. OPC manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone. Conventional concrete production and use is not optimal in terms of both economics and environmental impact. Such conventional concrete production technologies involve large energy consumption and carbon dioxide emission, leading to an unfavorable carbon footprint. Furthermore, increasing scarcity of the supplies of limestone also negatively impacts the sustainability of the continued use of ordinary hydraulic cement formulations such as Portland cement.

This recognition was one of the factors leading to the development of carbonatable cement formulations. Carbonatable cement refers to cement that is principally cured by reaction with carbon dioxide, $CO_2$, in any of its forms, such as, gaseous $CO_2$ in the presence of water, $CO_2$ in the form of carbonic acid, $H_2CO_3$, or in other forms that permit the reaction of $CO_2$ with the non-hydraulic cement material. The curing process sequesters carbon dioxide gas within the cured material, thus providing obvious environmental benefits. By way of example, Solidia Cement™ has been heralded as a breakthrough technology, having been recognized, for example, as one of the top 100 new technologies by the R&D 100 awards. The production of Solidia Cement™ and its use in concrete reduces the $CO_2$ footprint of these materials by up to 70% when compared with Portland cement and its use in traditional hydraulic concrete. In addition, 80% of the water used in Solidia Cement based concrete making can be easily reclaimed and reused.

Precast concrete objects formed from OPC, such as prestressed concrete girders, beams and railway ties, typically include embedded plain carbon steel as reinforcement. In addition, cast-in-place concretes such as bridge deck slabs and pavements are often reinforced with steel. For example, reinforcing bars (rebar) are common steel bars or meshes of steel wires are regularly used as tension devices in reinforced concrete and reinforced masonry structures to strengthen as well as to hold the concrete in compression. Epoxy coated steel, galvanized steel, and/or stainless steel can also be used as reinforcement elements.

Hydration of OPC in the presence of water produces a solution within the porous material that consists mainly of alkali hydroxides, such as, $Ca(OH)_2$, NaOH and KOH. Depending on the composition of the cement and the aggregates, the pH of the pore solution is typically between 12.5 and 13.5. However, OPC can also undergo a carbonation reaction upon exposure to $CO_2$ under certain conditions. For example, $Ca(OH)_2$ can react with $CO_2$ to form $CaCO_3$ and $H_2O$. When conventional concrete undergoes carbonation, the pH of a solution of water and ions dissolved from cement (e.g., calcium, sodium and/or potassium ions) resident within pores of the material ("pore solution") drops to values approaching pH of 9 as a consequence of drastic reduction in the concentration of hydroxyl ions. Penetration of salts from the environment may also lead to a remarkable change in the composition of the pore solution.

Corrosion of plain carbon steel in conventional concrete is initiated when a passive film on the surface of iron or steel (e.g., plain carbon steel) is removed either by lowering of the pore solution pH or by combination of low pore solution pH and presence of chlorides. OPC typically provides an initial pore solution pH value higher than 12, helping the rebar avoid or slow the corrosion process. However, during the service lifetime, OPC is affected by chloride penetration from salts during winter season and/or a carbonation reaction with atmospheric carbon dioxide ($CO_2$) that reduces the pore solution pH of conventional concrete. Corrosion products formed due to the corrosion are volumetrically expansive in nature. These corrosion products from the corrosion of the rebar can produce severe internal stresses on the surrounding OPC, leading to cracking, spalling, and ultimately, structural failure.

Similar to OPC based conventional concrete, carbonatable low calcium silicate based uncarbonated concrete materials, such as those described above (i.e., Solidia Cement™ and Solidia Concrete™) have a pore solution which has a pH value of greater than 12 when it is freshly mixed. However, upon carbonation, the pH value of the pore solution decreases during curing. The hardening of the material is facilitated through a curing process in which calcium silicates carbonate to form calcium carbonate. The pH value of the pore solution in a fully reacted low calcium silicate based carbonated concrete with compressive strength of 10,000 psi, or more, is about 9.5. With the pore solution having such a low pH value, a passive film on the surface of reinforcing or embedded steel is susceptible to corrosion as soon as fresh water or chloride ions reaches the surface of the reinforcement material.

Thus, there is an on-going need for novel and improved material compositions and production processes that address the issues of corrosion of iron or steel (e.g., plain carbon steel) components in low calcium silicate based carbonatable non-hydraulic cement and concrete products.

While certain aspects of conventional technologies have been discussed to facilitate disclosure of the invention, Applicants in no way disclaim these technical aspects, and it is contemplated that the claimed invention may encompass or include one or more of the conventional technical aspects discussed herein.

SUMMARY

The invention provides novel methods and compositions that prevent, mitigate or delay the onset of corrosion of iron or steel (e.g., plain carbon steel) components used as reinforcement or otherwise embedded in carbonated materials, such as carbonated low calcium silicate based concrete or composite materials, and objects made from carbonatable low calcium silicate based cement ("CSC cement"). The invention includes novel curing methods and formulations that prohibit or delay the corrosion of plain carbon steel, epoxy coated steel, galvanized steel, and/or stainless steel reinforcement in low-calcium silicate cement based materials, such as carbonated calcium silicate cement-based concrete ("CSC concrete") objects.

For example, the compressive strength of CSC concrete is reaction dependent, and carbonated concrete objects can achieve a compressive strength of 10,000 psi or more. As is disclosed herein, with modification of mix design, curing conditions and/or duration of curing time, a compressive strength of about 3,500 to about 10,000 psi, or more, can be achieved in carbonated CSC with corresponding pore solution pH values greater than about 9.5, and even approaching values of up to about 13.5. This favorable pH value provides protection to iron or steel in contact with CSC cement or CSC concrete and retards the corrosion thereof.

A number of aspects of the present invention will now be described. It should be understood that the inventors contemplate that any of features or aspects of the present invention listed below, or elsewhere described herein, can be combined in any order and in any number, with any other feature or aspect of the present invention.

A carbonated composite material is provided, including a bonding matrix comprising a plurality of bonding elements; and a plurality of pores comprising a pore solution having a pH greater than about 9.5, wherein each bonding element comprises a core, wherein the core comprises of a carbonatable material, a first silica-rich layer that at least partially covers some peripheral portion of the core, and a second calcium and/or magnesium carbonate-rich layer that at least partially covers some peripheral portion of the first silica-rich layer; and wherein the carbonated composite material has a compressive strength of 3,500 psi or greater.

The carbonated composite material as described herein, wherein the pore solution has a pH of about 10 to about 13.5.

The compressive strength can be 4,000 psi or greater.

The compressive strength can be 5,000 psi or greater.

The compressive strength can be greater than about 7,000 psi.

The compressive strength can be greater than about 10,000 psi.

The bonding matrix may further comprises one or more pH enhancing additives.

The one or more pH enhancing additives can be selected from the group consisting of calcium nitrate tetrahydrate, calcium nitrite, NaOH, sodium bicarbonate, OPC, sodium silicate, high alkalinity concrete recycled materials (CRM), slag aggregate, deadburned CaO, deadburned MgO, and combinations thereof.

The porous body may further comprise one or more additives to improve water resistance.

The one or more additives to improve water resistance can be selected from the group consisting of Class C fly ash, Class F fly ash, ground granulated blast furnace slag (GGBFS), fine glass powder, vitreous calcium aluminosilicate, silica fume, limestone powder, and combination thereof. 10.

The porous body may further comprises one or more water reducing additives, air entraining additives, set retarders, and combinations thereof.

A concrete object can be formed from the carbonated composite material as described herein, and may further comprise one or more iron or steel components at least partially embedded therein.

The one or more iron or steel components can be made of plain carbon steel, epoxy coated steel, galvanized steel, and/or stainless steel.

The one or more iron or steel components can be a reinforcement bar or mesh.

A method of making a carbonated low calcium silicate cement-based material is provided that includes: mixing a low calcium silicate cement with water, and filler particles comprising CaO or $SiO_2$ having a particle size of 0.1 μm to 1000 μm, to form a wet mixture, casting the wet mixture in a mold, wherein the cast wet mixture has a plurality of pores that contain at least some of the water, wherein the water dissolves at least some elements from the low calcium silicate cement and/or the filler particles to produce a pore solution, wherein the pore solution in the cast wet mixture has a pH of 11.5 or greater; optionally pre-curing the cast wet mixture; removing the cast wet mixture or the pre-cured cast wet cast mixture from the mold to obtain a porous body comprising pores containing the pore solution; and curing the porous body comprising pores containing the pore solution under the conditions of: a pressure from about atmospheric pressure to about 30 psi, a temperature in the range from about 30° C. to about 90° C., a relative humidity of about 10% to about 90%, an atmosphere of a $CO_2$ gas concentration of about 15% to about 100%, and for a duration of about 8 hours to about 14 days, to form the low calcium silicate cement-based carbonated material comprising pores containing a modified pore solution, wherein the modified pore solution in the cured low calcium silicate cement-based carbonated composite material has a pH of at least 9.5.

The method as described herein, wherein the modified pore solution in the cured low calcium silicate cement-based carbonated composite material can have a pH of about 10 to about 13.5.

The method as described herein, may further include, prior to the curing step, cutting or otherwise manipulating the porous body into a desired product shape.

The method as described herein, wherein the porous body may further include one or more pH enhancing additives.

The method as described herein wherein the one or more pH enhancing additives can be selected from the group consisting of calcium nitrate tetrahydrate, calcium nitrite, NaOH, sodium bicarbonate, OPC, sodium silicate, deadburned CaO, deadburned MgO, high alkalinity concrete recycled materials (CRM), slag aggregate, and combinations thereof.

The method as described herein, which may further include adding one or more additives to improve water resistance when forming the wet mixture.

The method as described herein, wherein the one or more additives to improve water resistance can be selected from the group consisting of Class C fly ash, Class F fly ash, ground granulated blast furnace slag (GGBFS), fine glass powder, vitreous calcium aluminosilicate, silica fume, limestone powder, and combination thereof.

The method as described herein, may further include adding one or more water reducing agents, air entraining agents, set retarders, or combinations thereof, when forming the wet mixture.

The method as described herein, may further include at least partially embedding one or more iron or steel components within the cast wet mixture.

The method as described herein, wherein the one or more iron or steel components can be made of plain carbon steel epoxy coated steel, galvanized steel, and/or stainless steel.

The method as described herein, wherein the one or more iron or steel components can be a reinforcement bar or mesh.

The method as described herein, wherein the optional pre-curing can be performed under a pressure of about atmospheric pressure to about 30 psi, a temperature of about 30° C. to about 90° C., a relative humidity of about 10% to about 90%, an atmosphere of air and/or $CO_2$ gas concentration of about 15% to about 100%, and for a duration of about 3 hours to about 14 days.

The method as described herein, wherein the curing can be performed under a pressure of about atmospheric pressure to about 30 psi, a temperature of about 30° C. to about 90° C., a relative humidity of about 10% to about 90%, an atmosphere of a $CO_2$ gas concentration of about 15% to about 100%, and for a duration of about 8 hours to about 28 days.

The method as described herein, wherein the pore solution in the cast wet mixture can have a pH of about 12 or more.

The method as described herein, wherein the modified pore solution can have a pH of about 10 to about 13.5.

The method as described herein, wherein the curing can be performed under conditions such that the carbonated composite material resulting therefrom has a compressive strength of at least about 3,500 psi.

The method as described herein, wherein the compressive strength can be 4,000 psi or greater.

The method as described herein, wherein the compressive strength can be 5,000 psi or greater.

The method as described herein, wherein the compressive strength can be greater than about 7,000 psi.

The method as described herein, wherein the compressive strength can be greater than about 10,000 psi.

The method as described herein, wherein the optional pre-curing is performed for at least 3 hours.

The method as described herein, where the optional pre-curing can be performed for at least 20 hours.

The method as described herein, wherein the optional pre-curing can be performed in less than about 7 days.

The method as described herein, wherein the optional pre-curing can be performed in less than about 14 days.

The method as described herein, wherein the curing can be performed for at least 8 hours.

The method as described herein, wherein the curing can be performed for at least 20 hours.

The method as described herein, wherein the curing can be performed in less than about 7 days.

The method as described herein, wherein the curing can be performed in less than about 14 days.

The method as described herein, wherein the curing can be performed in less than about 28 days.

A carbonated composite material can be produced by a method as described herein.

A concrete object can be formed comprising the carbonated composite material as described herein.

Various aspects and features of the present invention will now be referenced below, and further explained in the Detailed Description. It should be understood that the applicant envisions that any of the individual features or aspects of the present invention can be combined with any number of the additionally described or identified features or aspects of the present invention, and any and all such combinations are contemplated and within the scope of the present invention.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
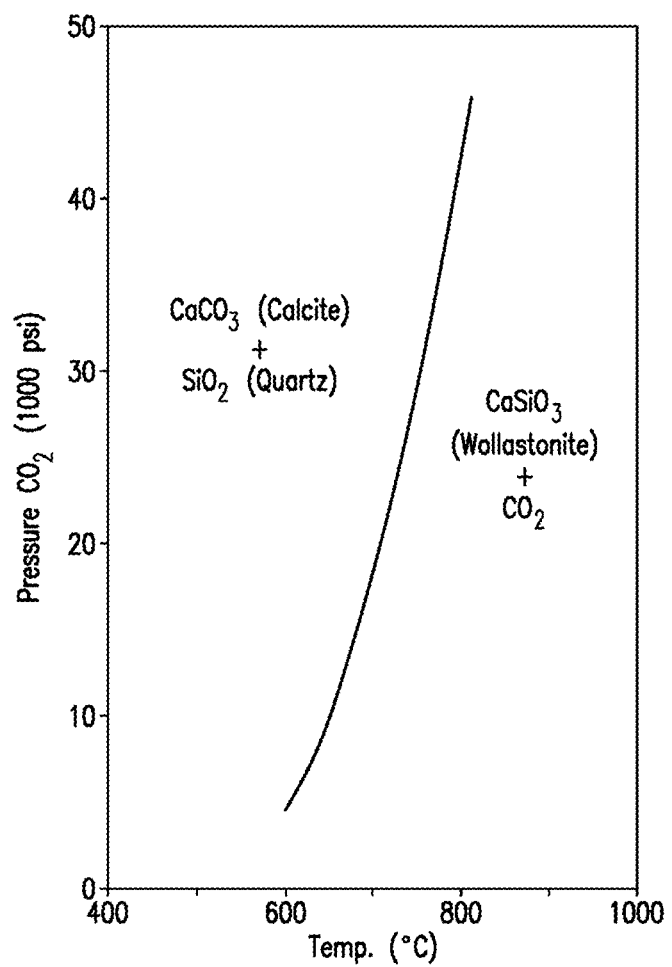
FIG. 1 is a pressure-temperature phase diagram showing the phases present in the reversible reaction $CaCO_3 + SiO_2 \leftrightarrow CaSiO_3$ (calcium silicate)$+CO_2$.
Figure 2:
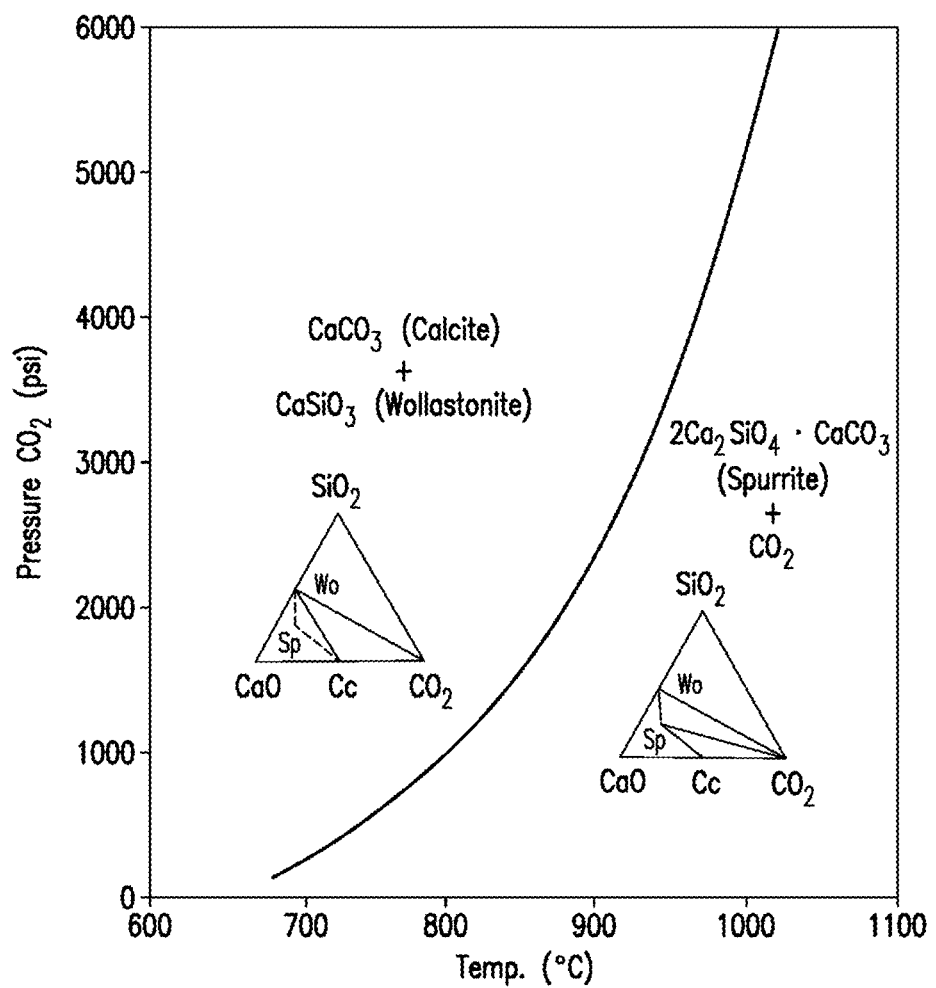
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
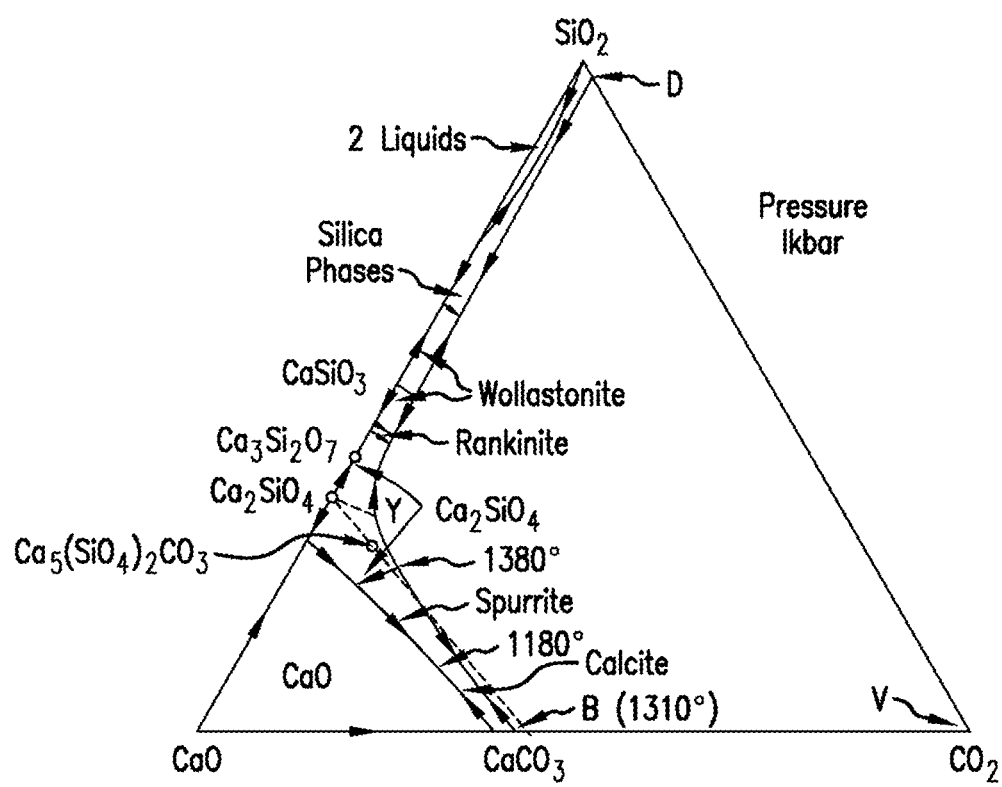
FIG. 3 is a phase diagram of the $CaO-SiO_2-CO_2$ system at a pressure of 1 kilobar.
Figure 4:
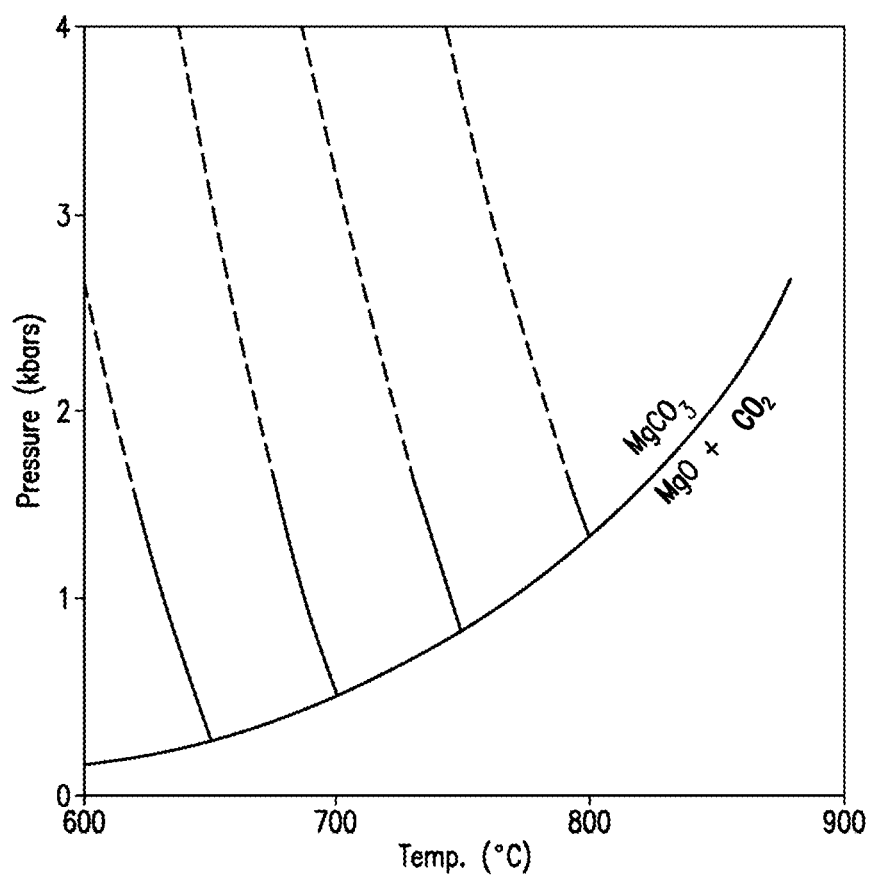
FIG. 4 is a pressure-temperature phase diagram showing the phases present in the reversible reaction $MgO + CO_2 \leftrightarrow MgCO_3$.
Figure 5:
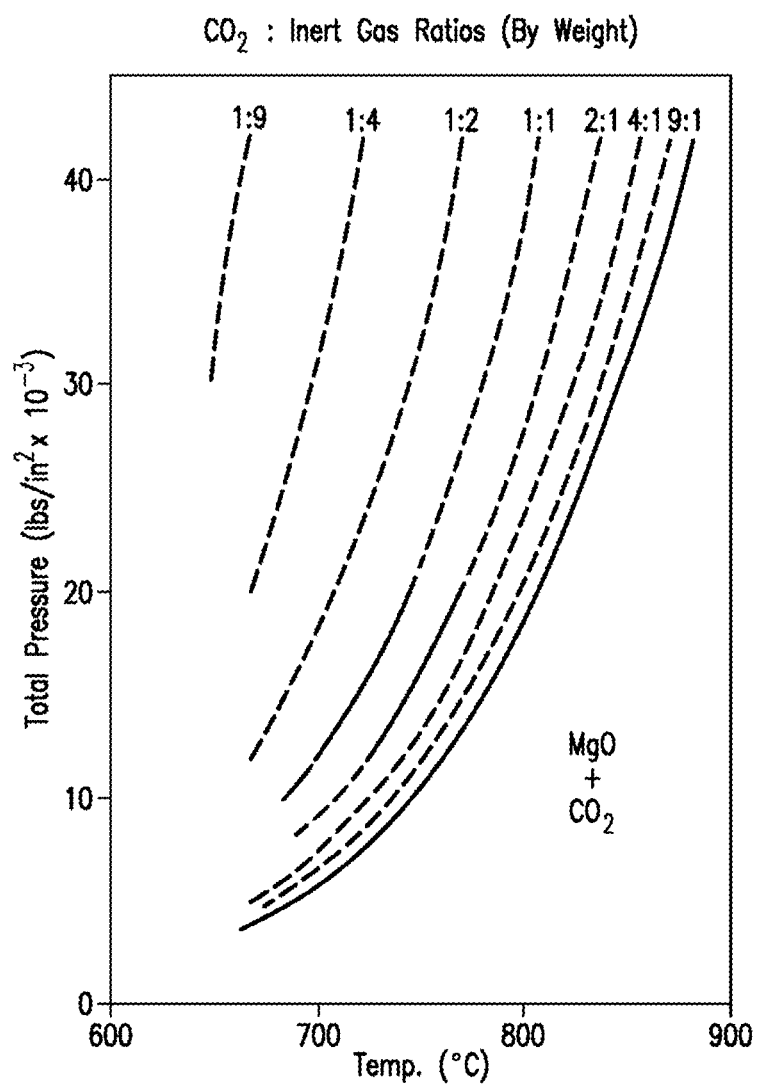
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
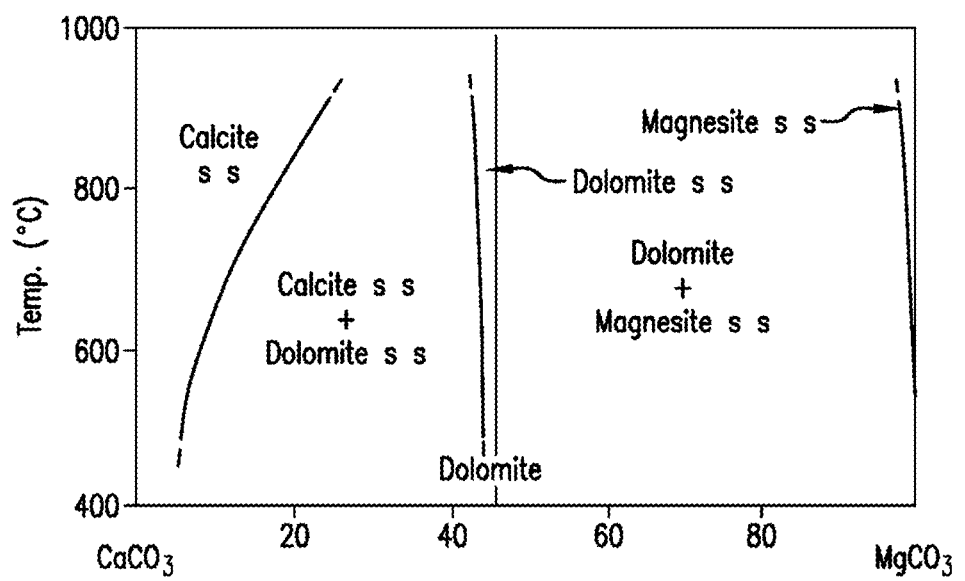
FIG. 6 is a temperature-composition phase diagram that illustrates the stability regions for various phases in the $CaCO_3-MgCO_3$ system.
Figure 7:
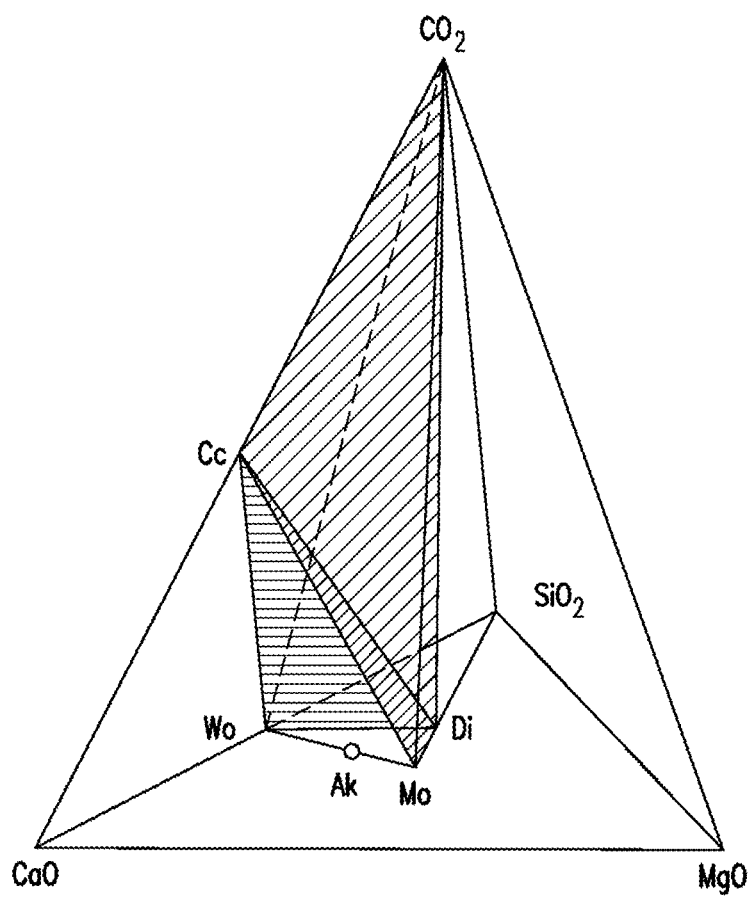
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
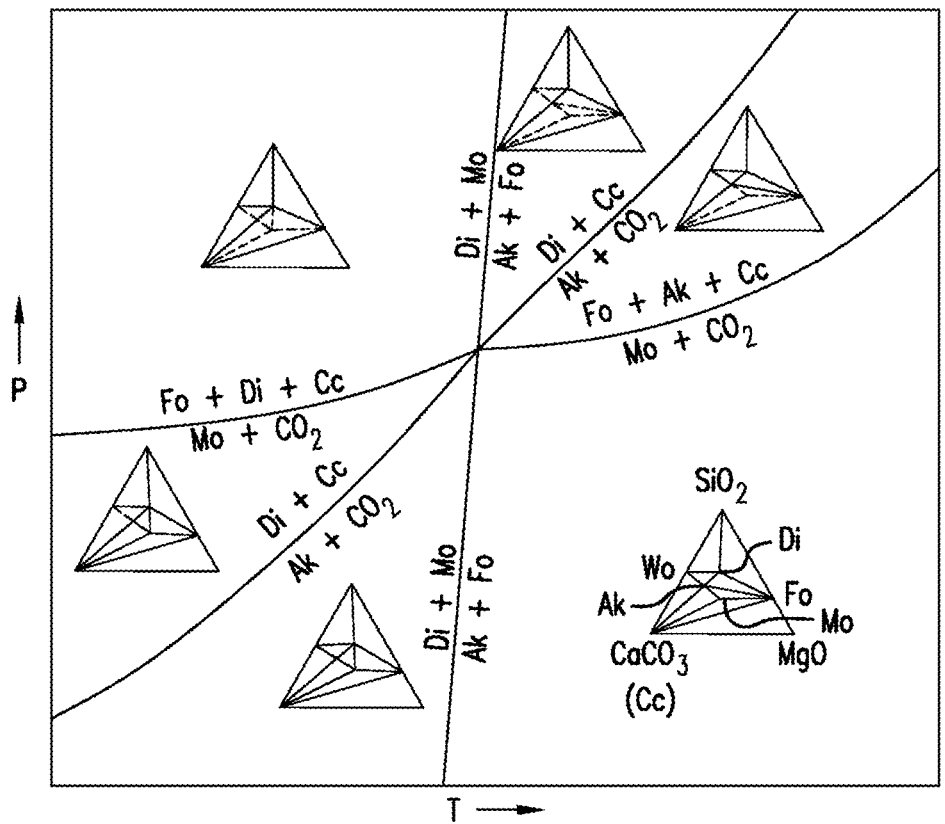
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

As used herein, the singular forms "a," "an" and "the" are intended to include the plural forms as well, unless the context clearly indicates otherwise. The use of "or" is intended to include "and/or", unless the context clearly indicates otherwise. Additionally, the use of "and" is intended to encompass "and/or," unless the context clear indicates otherwise.

As used herein, "about" is a term of approximation and is intended to include minor variations in the literally stated amounts, as would be understood by those skilled in the art. Such variations include, for example, standard deviations associated with techniques commonly used to measure the recited amounts.

All of the numerical values contained in this disclosure are to be construed as being characterized by the above-described modifier "about," are also intended to include the exact numerical values disclosed herein. The ranges disclosed herein should be construed to encompass all values within the upper and lower limits of the ranges, unless indicated otherwise. Moreover, all ranges include the upper and lower limits.

As used herein, low calcium silicate based cement or "CSC cement," means a material composed mainly of calcium silicates and having a Ca to Si atomic ratio of 0.8 to 2.0. "CSC concrete" means a composite formed from carbonated CSC cement.

As used herein, "pore solution" means a solution of water and ions dissolved from the components of the composite, such as, but not limited to the cement (e.g., calcium, sodium, and/or potassium ions), aggregates, and other additives, and residing in one or more pores present in a green, partially cured, or fully cured cement or concrete body or mass.

As used herein, "cementitious material" means a material that includes reactive filler material like vitreous calcium alumino silicate, fly ash, slag and ordinary portland cement (OPC), non-reactive filler like fine limestone powder, silica fume and glass powder. Cementitious content is total amount of cement and cementitious materials described herein.

As used herein, "high alkalinity concrete recycled materials" or "CRM" means aggregates retrieved from crushing old OPC based concrete elements like slabs, pavements, beams, and columns, and which has a pore solution pH greater than 11.5.

As used herein, "slag aggregate" means aggregates retrieved from crushing blast furnace slag in a coarse form and which has a pore solution pH greater than 11.0.

The invention provides compositions, production processes and systems that address corrosion of iron or steel components in concrete objects, especially low calcium silicate cement-based composite material bodies. The disclosed methods enable prevention, mitigation or delay of corrosion of iron or steel components (e.g., plain carbon steel, epoxy coated steel, galvanized steel, and/or stainless steel, reinforcement bars or meshes) used with or at least partially embedded in the concrete composite materials, and objects made from carbonatable low calcium silicate based cement and concrete ("CSC cement" and "CSC concrete").

Thus, carbonated low calcium silicate cement-based material, according to certain aspects of the present invention, has a plurality of pores with modified pore solution located in one or more of the pores having a pH of greater than about 9.5, preferably greater than about 10, preferably greater than about 11, preferably greater than about 11.5, preferably greater than about 12.0, preferably greater than about 12.5, preferably greater than about 13.0, and preferably about 13.5. The modified pore solution can have a pH from about 9.5 to about 13.5, inclusive of these upper and lower limits, and all integers encompassed within the range.

These carbonated composite materials and objects not only provide an a beneficial pH environment that prevents, mitigates or delays corrosion but also afford adequate compressive strength required for service conditions, increased water resistance, all without affecting the material's freeze-thaw durability and suitability for cold weather applications. This feature allows significant improvement in the service life and utility of manufactured low calcium silicate cement-based composite material and objects formed therefrom.

The carbonated low calcium silicate cement-based composite material having at least one, or a plurality of pores, with the modified pore solution having a pH value as described above may also have a suitable compressive strength of, for example, 3,500 psi or greater, greater than about 4,000 psi, greater than about 5,000 psi, greater than about 6,000 psi, greater than about 7,000 psi, greater than about 8,000 psi, greater than about 9,000 psi, or equal to or greater than about 10,000 psi. The compressive strength may be from about 3,500 psi to about 10,000 psi, inclusive of these upper and lower limits, and all integers encompassed within the range. Such compressive strengths may be obtained from a total curing time of less than 7 days from the date of the beginning of carbonation, and about 8 hours or more. In certain embodiments, such compressive strengths can be obtained from a total curing time of less than about 14 days from the date of beginning carbonation, and about 8 hours or more. In other embodiments, such compressive strengths obtained from a total curing time of less than about 28 days from the date of beginning carbonation, and about 8 hours or more. Thus, the total curing times may range from about 8 hours to about 28 days. The total curing times include the upper and lower limits mentioned above, as well as all time values falling within the specified range. The total curing times include any optional pre-curing times, as further described herein.

In certain embodiments, the concrete composite materials and objects made from low calcium silicate cement comprise a porous body. The porous body may further include one or more pH enhancing additives. Exemplary pH enhancing additives include calcium nitrate tetrahydrate, calcium nitrite, NaOH, sodium bicarbonate, OPC, sodium silicate, deadburned CaO, deadburned MgO, high alkalinity concrete recycled material (CRM), slag aggregate, and combinations thereof. As used herein "deadburned" CaO and MgO are oxides of calcium and magnesium having little or no reactivity as a result of being calcined at high temperatures. The pH enhancing additive(s) can be added to the formulation at dosage of about 1% to about 20%, by mass, relative to the total amount of cementitious materials. These additives are added to the dry mix in a mixer along with low calcium silicate cement. As used herein "deadburned" CaO and MgO are oxides of calcium and magnesium having little or no reactivity as a result of being calcined at high temperatures.

In certain embodiments, the porous body may further include one or more additives to improve water resistance. Exemplary additives to improve water resistance is selected from the group consisting of Class C fly ash, Class F fly ash, ground granulated blast furnace slag (GGBFS), fine glass powder, vitreous calcium aluminosilicate (VCAS), silica fume, limestone powder, and combinations thereof. The water resistance additives are included at dosage of about 1% to about 20%, by mass, relative to the total amount of cementitious materials. These additives can be added to the dry mix in a mixer along with low calcium silicate cement.

The porous body may further include one or more water reducing agent(s), air entraining agent(s), set retarder(s), and/or combinations thereof, each at a dosage of 1 to 15 ml per kilogram of cementitious materials. These additives are added to the dry mix in a mixer along with low calcium silicate cement.

In one aspect, the low calcium silicate cement-based composite material having a plurality of pores with modified pore solution includes a bonding matrix, the bonding matrix comprising a plurality of bonding elements, each bonding element comprises a core, wherein the core comprises of a carbonatable material, a first silica-containing layer that at least partially covers at least some peripheral portion of the core, and a second calcium and/or magnesium carbonate-containing layer that at least partially covers some peripheral portion of the first silica-containing layer. In certain embodiments, the core comprises at least one synthetic formulation comprising calcium or magnesium, silicon, and oxygen. In other embodiments, the bonding matrix is prepared from a porous body, wherein the porous body comprises a plurality of precursor particles, and the precursor particles are transformed into the bonding elements.

Figure 11A:
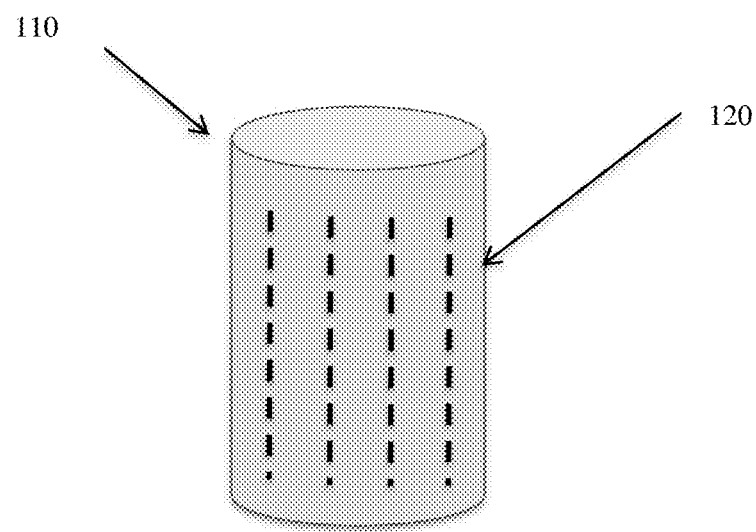
FIGS. 11A-11B are exemplary porous low calcium silicate based cement bodies with metal reinforcement elements disposed therein.
Figure 11B:
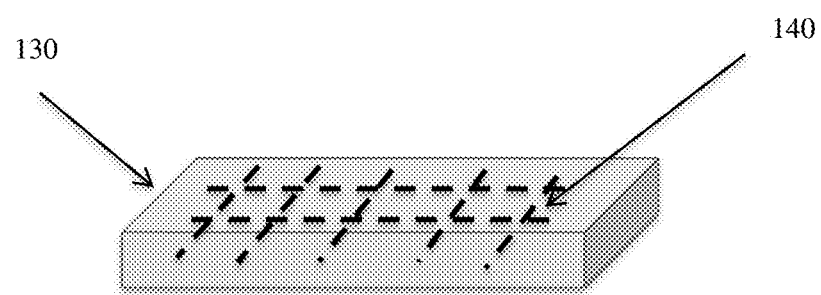

In another aspect, as illustrated in FIGS. 11A-11B, the invention generally relates to a concrete object (110, 130) comprising a low calcium silicate cement-based composite material having a modified pore solution, and one or more iron or steel components (120, 140) at least partially embedded therein. In certain embodiments, the one or more iron or steel components is made of plain carbon steel epoxy coated steel, galvanized steel, and/or stainless steel. In certain embodiments, the one or more iron or steel components is a reinforcement bar or mesh (140).

In yet another aspect, the invention generally relates to methods of making low calcium silicate cement composite materials and objects made therefrom. A method of making a carbonated low calcium silicate cement-based material includes: mixing a low calcium silicate cement with water, and filler particles comprising CaO or $SiO_2$ having a particle size of 0.1 μm to 1000 μm, to form a wet mixture, casting the wet mixture in a mold, wherein the cast wet mixture has a plurality of pores that contain at least some of the water, wherein the water dissolves at least some elements from the low calcium silicate cement and/or the filler particles to produce a pore solution, wherein the pore solution in the cast wet mixture has a pH of 11.5 or greater; optionally pre- curing the cast wet mixture; removing the cast wet mixture or pre-cured cast wet mixture from the mold to obtain a porous body comprising pores containing the pore solution; and curing the porous body comprising pores containing the pore solution under the conditions of: a pressure from about atmospheric pressure to about 30 psi, a temperature in the range from about 30° C. to about 90° C., a relative humidity of about 10% to about 90%, an atmosphere of a $CO_2$ gas concentration of about 15% to about 100%, and for a duration of about 8 hours to about 28 days, to form the low calcium silicate cement-based carbonated material comprising pores containing a modified pore solution, wherein the modified pore solution in the cured low calcium silicate cement-based carbonated composite material has a pH of at least 9.5.

In certain embodiments, the method further includes, optionally pre-curing the cast mixture to form a porous body with a sufficient hardness to allow it to be taken out of the mold, moved, and subsequently cured. The optional pre-curing of the cast mixture can be performed under the following conditions: a pressure of about atmospheric pressure to about 30 psi, a temperature of about 30° C. to about 90° C. (e.g., about 30° C. to about 80° C., about 30° C. to about 70° C., about 30° C. to about 60° C., about 30° C. to about 50° C., about 40° C. to about 90° C., about 50° C. to about 90° C., about 60° C. to about 90° C.), a relative humidity of about 10% to about 90% (e.g., about 10% to about 70%, about 10% to about 50%, about 10% to about 30%, about 20% to about 90%, about 40% to about 90%, about 60% to about 90%), an atmosphere comprising ambient air, $CO_2$ gas, or a combination of the two either sequentially or a mixed environment containing both, with a $CO_2$ concentration (when present) of about 15% to about 100% (e.g., about 15%, about 15% to about 90%, about 15% to about 80%, about 15% to about 70%, about 30% to about 90%, about 30% to about 80%, about 30% to about 70%, about 40% to about 100%, about 50% to about 100%, about 60% to about 100%), and for a duration of about 3 hours to about 14 days (e.g., about 3 hours to 7 days, about 3 hours to 4 days, about 3 hours to 3 days, about 3 hours to 2 days, about 3 hours to 36 hours, about 3 hours to 24 hours, about 3 hours to 12 hours, about 6 hours to 14 days, about 12 hours to 14 days, about 20 hours to 14 days, 1 to 14 days, about 3 to 14 days, about 7 to 14 days). All of the above values include the specified upper and lower limits, as well as all integers encompassed within the ranges.

In some embodiments, prior to the curing step, the pre-cured cast mixture is cut or otherwise manipulated into a desired product shape.

In certain embodiments of the methods, the methods include adding one or more pH enhancing additives during the process of forming a porous body. Such pH enhancing additive(s) include: calcium nitrate tetrahydrate, calcium nitrite, NaOH, sodium bicarbonate, OPC, sodium silicate, deadburned CaO, deadburned MgO, high alkalinity concrete recycled material (CRM), slag aggregate, and combinations thereof. The pH enhancing additive(s) can be added to the formulation at dosage of about 1% to about 20%, by mass, of the total amount of cementitious materials. These additives are added to the dry mix in a mixer along with low calcium silicate cement. As used herein "deadburned" CaO and MgO are oxides of calcium and magnesium having little or no reactivity as a result of being calcined at high temperatures.

In certain embodiments of the methods, the porous body further includes adding one or more additives to improve water resistance (e.g., Class C fly ash, Class F fly ash, ground granulated blast furnace slag (GGBFS), fine glass powder, vitreous calcium aluminosilicate, silica fume, limestone powder, and combination thereof). The water resistance additives are included at dosage of about 1% to about 20%, by mass, relative to the total amount of cementitious materials. These additives can be added to the dry mix in a mixer along with low calcium silicate cement.

In certain embodiments of the methods, one or more water reducing agents, air entraining agents, set retarders, and combinations can be added during the process of forming the porous body.

In certain embodiments of the methods, the porous body has fully or partially embedded therein one or more iron or steel components (e.g., made of plain carbon steel, epoxy coated steel, galvanized steel, or, stainless steel), such as reinforcement bars or meshes.

In certain embodiments of the methods, curing is performed under the following conditions to form the carbonated low calcium silicate cement composite materials and objects made therefrom: a pressure from about atmospheric pressure to about 30 psi, a temperature of about 30° C. to about 90° C., a relative humidity of about 10% to about 90%, an atmosphere comprising $CO_2$ gas at a concentration of about 15% to about 100%. Total curing time is less than 7 days from the date of the beginning of carbonation, and about 8 hours or more. In certain embodiments, a total curing time is less than about 14 days from the date of beginning carbonation, and about 8 hours or more. In other embodiments, a total curing time is less than about 28 days from the date of beginning carbonation, and about 8 hours or more. Thus, the total curing times may range from about 8 hours to about 28 days. The total curing times and conditions include the upper and lower limits mentioned above, as well as all integers falling within the specified range. The total curing times include any optional pre-curing times, as further described herein. Curing can be carried out as a single curing step on the cast mixture. Alternatively, curing can be performed in two or more stages. For example, the cast mixture can be pre-cured, the pre-cured body removed from its mold, and subsequently cured in an additional phase. The curing conditions described above apply to the mandatory curing step that imparts adequate carbonation and final strength. The same conditions can be used for pre-curing, except that the pre-curing atmosphere can comprise ambient air, $CO_2$ gas, or a combination of the two either sequentially or a mixed environment containing both. Alternatively, while each phase of curing is conducted within the pressure, temperature and carbon dioxide concentration ranges described above, the total curing time is no more than 28 days in length, no more than 14 days in length, no more than 7 days in length, no more than 24 hours in length, or no more than 20 hours in length.

In further embodiments of the method, the green (uncarbonated) porous body made from low calcium silicate cement is characterized by a plurality of pores having in one or more pores therein a pore solution with an initial pH (i.e., prior to curing or pre-curing) greater than about 12 (e.g., greater than about 12.5, or greater than about 13).

In other embodiments of the methods, the low calcium silicate cement porous body is carbonated, including any optional pre-curing and curing phases under the conditions described herein, to render low calcium silicate cement materials and objects made therefrom having a plurality of pores with a modified pore solution in one or more pores therein with a pH of greater than about 9.5, preferably greater than about 10, preferably greater about 11, preferably greater than about 11.5, preferably greater than about 12.0, preferably greater than about 12.5, preferably greater than about 13.0, and preferably about 13.5. The modified pore solution can have a pH from about 9.5 to about 13.5, inclusive of these upper and lower limits, and all integers encompassed within the range.

In certain embodiments of the methods, the low calcium silicate cement materials and objects made therefrom described herein can be further characterized by a providing a carbonated body having a compressive strength of, for example, 3,500 psi or greater, greater than about 4,000 psi, greater than about 5,000 psi, greater than about 6,000 psi, greater than about 7,000 psi, greater than about 8,000 psi, greater than about 9,000 psi, or equal to or greater than about 10,000 psi. The compressive strength may be from about 3,500 psi to about 10,000 psi, inclusive of these upper and lower limits, and all integers encompassed within the range. Such compressive strengths may be obtained from a total curing time of less than 7 days from the date of the beginning of carbonation, and about 8 hours or more. In certain embodiments, such compressive strengths obtained from a total curing time of less than about 14 days from the date of beginning carbonation, and about 8 hours or more. In other embodiments, such compressive strengths obtained from a total curing time of less than about 28 days from the date of beginning carbonation, and about 8 hours or more. Thus, the total curing times may range from about 8 hours to about 28 days. The total curing times include the upper and lower limits mentioned above, as well as all time values falling within the specified range. The total curing times include any optional pre-curing times, as further described herein. The curing and optional pre-curing conditions are previously described herein.

In certain embodiments, the method further includes treating carbonated low calcium silicate cement materials and objects made therefrom with a high pH solution (e.g., saturated lime water) for a period of time sufficient to increase the pH of the pore solution. In some embodiments the exposure to the high pH solution increases the pH of pore solution in a low calcium silicate based concrete. The high pH solution can be made with materials like sodium hydroxide, calcium hydroxide, potassium hydroxide. The dosage of these materials can be from 0.01N to 1N. The saturated lime water can be made, for example, by putting more than 2 g of calcium hydroxide in 1 L deionized water. These high pH solutions can be used to completely submerge low calcium silicate based material therein.

In another method, a high pH solution can be infiltrated into these low calcium silicate cement by creating dikes about 2 inches high and ponding the high pH solution on a surface of the low calcium silicate cement body for a sufficient period of time to raise the pH of the pore solution to a value described herein. Suitable time periods for exposure are not particularly limited, but can be, for example, on the order of at least one week. In some embodiments, the exposure to the high pH solution is preferably two weeks or longer.

In yet another aspect, the invention generally relates to a carbonated low calcium silicate cement composite material produced by the methods disclosed herein. As illustrated in FIGS. 11A-11B, the methods can yield a concrete object (110, 130) comprising a low calcium silicate cement-based composite material having a modified pore solution and one or more iron or steel components (120, 140) at least partially embedded therein. In certain embodiments, the one or more iron or steel components is made of plain carbon steel epoxy coated steel, galvanized steel, and/or stainless steel. In certain embodiments, the one or more iron or steel components is a reinforcement bar or mesh (140). The reinforcing elements are introduced in any conventional manner, such as being placed with a mold prior to introducing the wet cement mixture therein.

Concrete composite materials and objects made from low calcium silicate cement of the invention exhibit significant improvement in the service life and utility of manufactured concrete objects. Concrete composite materials and objects made from low calcium silicate cement produced according to the disclosed method show excellent performance in both fresh water and salt-water environments. In certain embodiments, corrosion of a carbonated reinforced low calcium silicate cement is not initiated in a fresh water environment is not initiated for at least 50 days, or at least in 60 days, or at least in 90 days, or at least in 180 days, or at least in 360 days, or at least in 720 days, or at least 1440 days, or at least 3600 days, or at least 7200 days, or at least 11000 days. In other embodiments, corrosion in a carbonated reinforced low calcium silicate cement in a salt-water environment is not initiated for at least 50 days, or at least in 60 days, or at least in 90 days, or at least in 180 days, or at least in 360 days, or at least in 720 days, or at least 1440 days, or at least 3600 days, or at least 7200 days, or at least 11000 days.

Precast Objects of Carbonatable Low Calcium Silicate Cements

The term "low calcium silicate" is previously defined herein. "Carbonatable," as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $Ca_7Mg$ $(SiO_4)_4$ or bredigite, $\alpha$-$Ca_2SiO_4$ or $\gamma$-$Ca_2SiO_4$, and sometimes formulated as $Ca_2SiO_4$ or $2CaO \cdot SiO_2$). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite ($(Ca,Na,K)_2[(Mg, Fe^{2+},Fe^{3+},Al,Si)_3 O_7]$) and crystalline silica ($SiO_2$).

It should be understood that, low calcium silicate compositions, phases and methods disclosed herein can be adapted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size, measured using commercially available particle size analyzer, such as Mastersizer 2000, of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 1 µm to about 5 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm, about 1 µm, 10 µm, 15 µm, 20 µm, 25 µm, 30 µm, 40 µm, 50 µm, 60 µm, 70 µm, 80 µm, 90 µm, 100 µm). The ground calcium silicate composition may have a bulk density of about 0.5 g/mL to about 3.5 g/mL (e.g., 0.5 g/mL, 1.0 g/mL, 1.5 g/mL, 2.0 g/mL, 2.5 g/mL, 2.8 g/mL, 3.0 g/mL, 3.5 g/mL), a tapped density of about 1.0 g/mL to about 1.2 g/mL, and a Blaine surface area of about 150 m²/kg to about 700 m²/kg (e.g., 150 m²/kg, 200 m²/kg, 250 m²/kg, 300 m²/kg, 350 m²/kg, 400 m²/kg, 450 m²/kg, 500 m²/kg, 550 m²/kg, 600 m²/kg, 650 m²/kg, 700 m²/kg). The "Blaine surface area" is a measure of the fineness of cement, and is measured by the ASTM C204 method.

In exemplary embodiments of the low calcium silicate composition of the invention, ground calcium silicate having a $d_{10}$ particle size greater than 1 µm is utilized in the composition.

Any suitable aggregate may be used to form composite materials from the carbonatable composition of the invention, for example, calcium oxide-containing and/or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size of about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical agents such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonation of CSC Cements

A major utility of the carbonatable CSC composition is that it can be carbonated to form composite materials that are useful in a variety of applications.

The following reactions are believed to take place during carbonation of calcium silicate as disclosed herein.

$$CaSiO_3(s)+CO_2(g) \rightarrow CaCO_3(s)+SiO_2(s) \quad (1)$$

$$Ca_3Si_2O_7(s)+3CO_2(g) \rightarrow 3CaCO_3(s)+2SiO_2(s) \quad (2)$$

$$Ca_2SiO_4(s)+2CO_2(g) \rightarrow 2CaCO_3(s)+SiO_2(s) \quad (3)$$

Generally, $CO_2$ is introduced as a gas phase that dissolves in an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example, in preferred embodiments, $CO_2$ is used as a reactive species resulting in sequestration of $CO_2$ and the creation of bonding elements in the resulting composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application. Ser. No. 12/984,299), U.S. Pub. No. 2009/0142578 (application. Ser. No. 12/271,513), U.S. Pub. No. 2013/0122267 (application. Ser. No. 13/411,218), U.S. Pub. No. 2012/0312194 (application. Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application. Ser. No. 14/045,758), U.S. Pub. No. 2015/0266778 (application. Ser. No. 14/045,519), U.S. Pub. No. 2014/0127458 (application. Ser. No. 14/045,766), U.S. Pub. No. 2014/0342124 (application. Ser. No. 14/045,540), U.S. Pub. No. 2014/0272216 (application. Ser. No. 14/207,413), U.S. Pub. No. 2014/0263683 (application. Ser. No. 14/207,421), U.S. Pat. Publ. No. 2014/0314990 (application. Ser. No. 14/207,920), U.S. Pat. No. 9,221,027 (application. Ser. No. 14/209,238), U.S. Pub. No. 2014/0363665 (application. Ser. No. 14/295, 601), U.S. Pub. No. 2014/0361471 (application. Ser. No. 14/295,402), U.S. Pub. No. 2016/0355439 (application. Ser. No. 14/506,079), U.S. Pub. No. 2015/0225295 (application. Ser. No. 14/602,313), U.S. Pub. No. 2015/0056437 (application. Ser. No. 14/463,901), U.S. Pub. No. 2016/0168720 (application. Ser. No. 14/584,249), U.S. Pub. No. 2015/0336852 (application. Ser. No. 14/818,629), U.S. Pub. No. 2016/0031757 (application. Ser. No. 14/817,193), U.S. Pub. No. 2016/0272544 (application. Ser. No. 15/074,659), U.S. Pub. No. 2016/0096773 (application. Ser. No. 14/874,350), U.S. Pub. No. 2016/0340261 (application. Ser. No. 14/715, 497), U.S. Pub. No. 2016/0272545 (application. Ser. No. 15/074,692), U.S. Pub. No. 2017/0102373 (application. Ser. No. 15/290,328), U.S. Pub. No. 2017/0121223 (application. Ser. No. 15/335,520), U.S. Pub. No. 2017/0204010 (application. Ser. No. 15/409,352), U.S. Pub. No. 2017/0253530 (application. Ser. No. 15/449,736), U.S. Pub. No. 2017/0260096 (application. Ser. No. 15/451,344), U.S. Pub. No. 2017/0320781 (application. Ser. No. 15/587,705), U.S. Pub. No. US 2017/0341989 (application. Ser. No. 15/609,908), U.S. application Ser. No. 15/716,392, filed Sep. 26, 2017, U.S. application Ser. No. 15/831,135, filed Dec. 4, 2017, each of which is expressly incorporated herein by reference in its entirety for all purposes.

FIGS. 1-8 are phase diagrams that show various phase interrelationships among some of the materials described herein.

Bonding Elements

The carbonation process produces a carbonated composite material and objects that microscopically includes a plurality of bonding elements having one or more types of microstructure. Collectively, the plurality of bonding elements form an inter-connected bonding matrix creating bonding strength and holding the composite material. For example, the microstructured bonding elements may be: a bonding element comprising a core of an unreacted carbonatable phase of calcium silicate fully or partially surrounded by a silica rich layer of varying thickness that is fully or partially encased by $CaCO_3$ particles; a bonding element comprising a core of silica formed by carbonation of a carbonatable phase of calcium silicate fully or partially surrounded by a silica rich layer of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich layer of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich layer of varying thickness that is fully or partially encased by $CaCO_3$ particles; or a bonding element comprising particles of partially reacted calcium silicate without a distinct core and silica layer encased by $CaCO_3$ particles; and a bonding element comprising porous particles without a distinct silica layer encased by $CaCO_3$ particles.

The silica rich layer generally displays a varying thickness within a bonding element and from bonding element to bonding element, typically of about 0.01 µm to about 50 µm. In certain preferred embodiments, the silica rich layer has a thickness of about 1 µm to about 25 µm. As used herein, "silica rich" generally refers to a silica content that is significant among the components of a material, for example, silica being greater than about 50% by volume. The remainder of the silica rich layer is comprised largely of $CaCO_3$, for example about 10% to about 50% of $CaCO_3$ by volume. The silica rich layer may also include inert or unreacted particles, for example about 10% to about 50% of melilite by volume. A silica rich layer generally displays a transition from being primarily silica to being primarily $CaCO_3$. The silica and $CaCO_3$ may be present as intermixed or discrete areas.

The silica rich layer is also characterized by a varying silica content from bonding element to bonding element, typically about 50% to about 90% by volume (e.g., from about 60% to about 80%). In certain embodiments, the silica rich layer is generally characterized by a silica content of about 50% to about 90% by volume and a $CaCO_3$ content of about 10% to about 50% by volume. In certain embodiments, the silica rich layer is characterized by a silica content of about 70% to about 90% by volume and a $CaCO_3$ content of about 10% to about 30% by volume. In certain embodiments, the silica rich layer is characterized by a silica content of about 50% to about 70% by volume and a $CaCO_3$ content of about 30% to about 50% by volume.

The silica rich layer may surround the core to various degrees of coverage anywhere from about 1% to about 99% of the outer surface area of the core (e.g., about 10% to about 90%). In certain embodiments, the silica rich layer surrounds the core with a degree of coverage less than about 10% of the outer surface area of the core. In certain embodiments, the silica rich layer of varying thickness surrounds the core with a degree of coverage greater than about 90% of the outer surface area of the core.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granules, oblongs, rods, ripples, etc.

The plurality of bonding elements may have any suitable mean particle size and particle size distribution dependent on the desired properties and performance characteristics of the composite product. In certain embodiments, for example, the plurality of bonding elements have a mean particle size of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm).

The inter-connected network of bonding elements (a bonding matrix) may also include a plurality of coarse and/or fine filler particles that may be of any suitable material, have any suitable particle size and particle size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size of about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

The weight ratio of bonding elements to filler particles may be any suitable ratios dependent on the intended application for the composite material product. For example, the weight ratio of bonding elements to filler particles may be about (5 to 99):about (1 to 95), e.g., about (10 to 99):about (1 to 90), about (20 to 99):about (1 to 80), about (30 to 99):about (1 to 70), about (50 to 90):about (10 to 50), about (70 to 90):about (10 to 30), about (5 to 90):about (10 to 95), about (5 to 80):about (20 to 95), about (5 to 60):about (40 to 95). In certain embodiments depending on the application, the weight ratio of bonding elements to filler particles may be about (10 to 50):about (50 to 90), e.g., about (30 to 50):about (50 to 70), about (40 to 50):about (50 to 60).

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granules, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

In certain preferred embodiments, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide). The pigment may be of any color or colors, for example, selected from black, white, blue, gray, pink, green, red, yellow and brown. The pigment may be present in any suitable amount depending on the desired composite material, for example in an amount of about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

In certain embodiments, the composite material is characterized by water absorption of less than about 10%, which is measured by soaking the material in water for 24 hours. The mass difference between mass of material soaked for 24 hours and oven dry mass (when dried for 24 hours at 105° C.) divided by oven dry mass to obtain water absorption. In some other embodiments, the composite material is characterized by water absorption of less than about 8%. In some other embodiments the composite material is characterized by water absorption of less than about 5%. In some other embodiments the composite material is characterized by water absorption of less than about 4%. In some other embodiments the composite material is characterized by water absorption of less than about 3%. In some other embodiments the composite material is characterized by water absorption of less than about 2%. In some other embodiments the composite material is characterized by water absorption of less than about 1%.

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

$CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a desired level so that curing can be performed thereafter. In simple systems, $CO_2$ gas is then fed into the system at a predefined rate so to maintain a concentration of $CO_2$ sufficient to drive the curing reaction.

In some embodiments, the $CO_2$ gas is blended with air inside the curing chamber to maintain the $CO_2$ concentration at about 30%, or about 40%, or about 45%, or about 50%, or about 60%, or about 65%, or about 70%, or about 75%, or about 80%, or about 85%, or about 90%, or about 95%, or about 99%.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as a nondispersive infrared sensor ("NDIR") should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
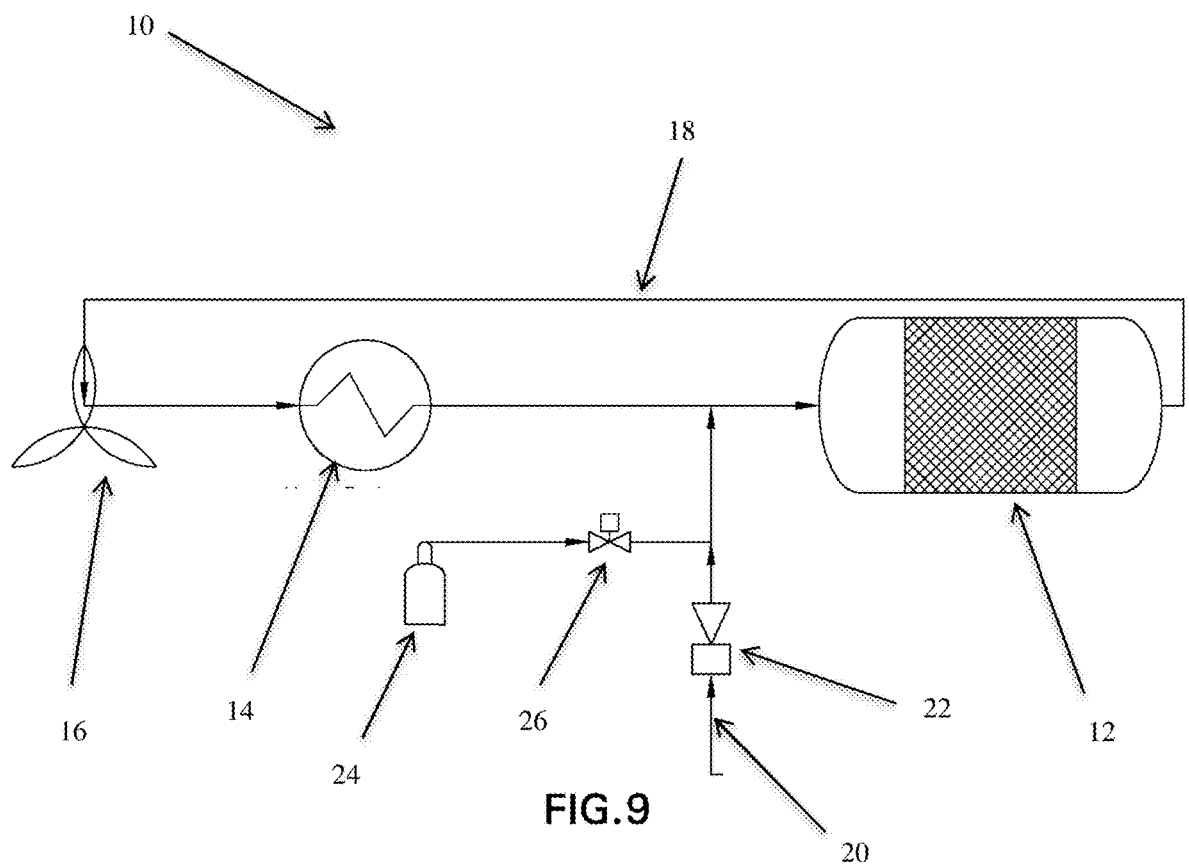
FIG. 9 is a schematic diagram of an exemplary $CO_2$-cured composite material curing chamber that provides humidification according to principles of the invention.

FIG. 9 is a schematic diagram of an exemplary $CO_2$ composite material curing chamber that provides humidification according to principles of the invention. As illustrated therein, the arrangement 10 includes a carbon dioxide curing chamber 12, heat exchanger 14, blower 16, gas recirculation line 18, water line 20, water atomizer or vapor generator 22, carbon dioxide source 24 and proportioning valve 26. In FIG. 9, the water supply 20 is provided and water vapor is added to the atmosphere that is circulating within the curing chamber 12. The water can be any convenient source of potable water. In some embodiments, ordinary tap water is used. In some embodiments, the water can be converted to vapor by the mechanism generically illustrated an element 22. This mechanism can be embodied by, for example, flowing water through a misting nozzle or an atomizing spray nozzle, an electric vapor generator, a gas fired vapor generator, or by being heated above the gas temperature in the chamber 12 so as to cause evaporation from a liquid water supply, an example being a drum reactor with an immersion heater. In yet another embodiment, the $CO_2$ supply 24 can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may be about 1% to about 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
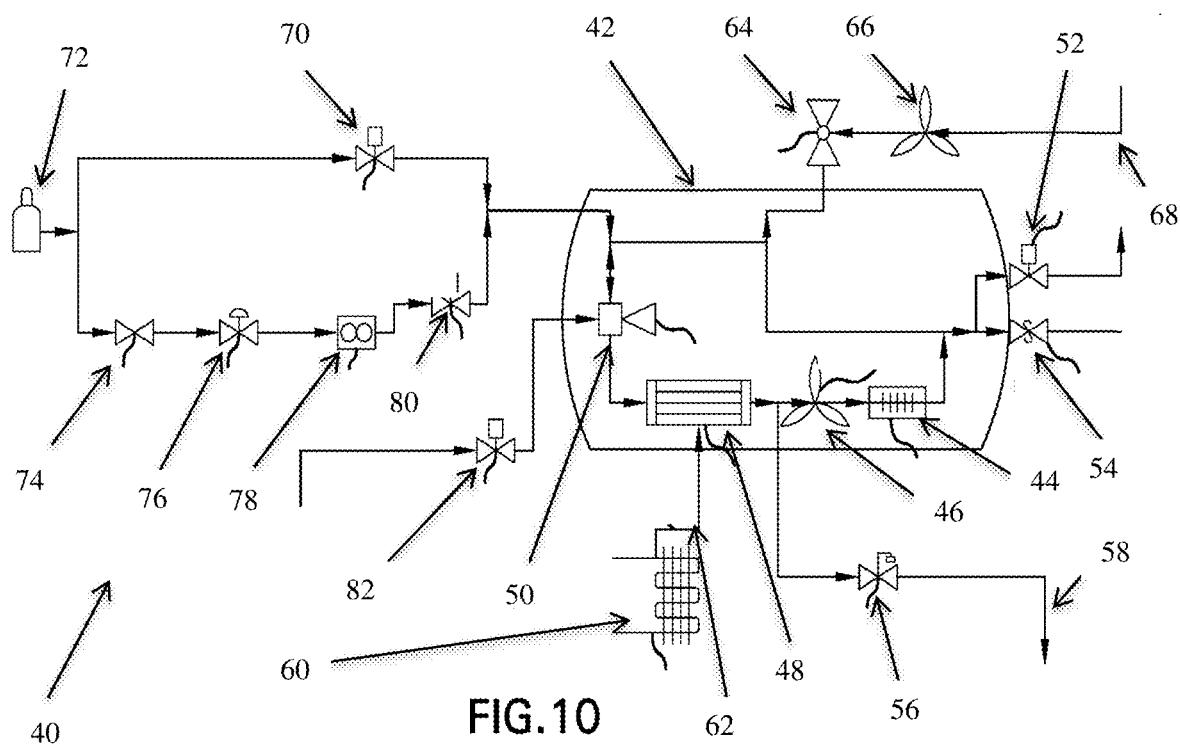
FIG. 10 is a schematic diagram of an exemplary curing chamber with multiple methods of humidity control as well as ability to control and replenish $CO_2$ using constant flow or pressure regulation and that can control the temperature.

FIG. 10 is a schematic diagram of an exemplary arrangement including a curing chamber with multiple methods of humidity control as well as ability to control and replenish $CO_2$ using constant flow or pressure regulation and that can control the temperature according to principles of the invention. As illustrated therein, the arrangement 40 includes a carbon dioxide curing chamber 42, a thin tube heater 44, fan or blower 46, chilling coil 48, water atomizer 50, purge/exhaust valve 52, bleed valve 54, condensate drain 56, condensate discharge line 58, air cooled condenser 60, chilled coolant line 62, fresh air damper valve 64, fresh air intake blower or fan 66, fresh air/atmosphere vent line 68, high flow carbon dioxide solenoid 70, carbon dioxide source 72, pressure regulator 74, low pressure regulator 76, flowmeter controller 78, low-flow carbon dioxide solenoid 80, water spray solenoid 82, and water inlet 84. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an resistance temperature detector (RTD). The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

This disclosure is not limited to the exact contents included herein. Combinations and/or modifications apparent to one of ordinary skill in the art are envisaged within the scope of this disclosure. Some non-limiting examples are described below to illustrate certain aspects of the invention.

EXAMPLES

Example 1. Relationship Between pH-Carbonation Duration-Compressive Strength

In the first method to mitigate corrosion initiation in carbonated low calcium silicate cement-based composite materials, as defined herein, and objects (commercially, produced as Solidia Concrete™ by Solidia Technologies Inc.), the final pH of a pore solution present within pores of the concrete is increased by methods including optimizing the curing duration. This is important for delaying the onset of corrosion initiation. Solidia Concrete™ can be made with diverse mixture proportions depending on the strength, durability and purpose for which concrete is used. The cement in combination with other filler materials like fly ash, slag, VCAS, limestone powder, also called as cementitious material content for one cubic meter of Solidia Concrete™ can be between 250 and 500 kg, preferably between 350 and 450 kg. For one cubic meter of Solidia Concrete™ sand content is between 700 and 1000 kg, ¼" aggregate content is between 500 and 600 kg and ⅜" aggregate content between 400 and 550 kg. In addition to these solid materials, commercial water reducing, air entraining, and set retarding admixtures, at different dosage levels were used. The cementitious material included Solidia Cement™, which is a low calcium silicate cement, reactive filler materials like fly ash, slag, vitreous calcium alumino silicate (VCAS) and ordinary Portland cement (OPC), non-reactive filler materials like fine limestone powder, silica fume, glass powder. The water reducing admixture can be in the form of a liquid and added in amounts of about 3 ml/kg to about 12 ml/kg of cementitious content, the air entraining agent can be in the form of a liquid and in the form of a liquid and added in amounts of about 1 ml/kg to about 7 ml/kg of cementitious content. The set retarding agent can also be in the form of a liquid and added in amounts of about 3 to about 10 ml/kg, and a corrosion inhibiting admixture can also be in liquid form and added at a dosage level of about 10 to about 30 ml/kg of cement content.

For Example 1, the actual amount of all ingredients used for 4 different types of Solidia Concrete™ mixtures is shown in Table 1. Ex-1-Mix-2 is the control Solidia Concrete™ and Ex-1-Mix-1 is a ternary blend replacing Solidia Cement™ with 20% OPC and 6% VCAS by mass. Ex-1-Mix-3 and Ex-1-Mix-4 were concretes with higher total cementitious content of 450 kg/m³, with 10% cement replacement by fine lime stone powder and OPC, respectively. Although, in some embodiments, the cement replacement can be as high as 50% with any of these reactive or non-reactive filler materials.

The following standard mixing procedure was used to form the Solidia Concrete™ mixes.
 a. Pour all the sand in the mixer. Mix it for 30 seconds.
 b. Pour 10% of mixing water into the mixer while mixer is running.
 c. Add all the air entraining admixture and mix it for 1 minute.
 d. Add 50% of the coarse aggregates into the mixer.
 e. Add all the cementitious materials including Solidia Cement into the mixer.
 f. Add remaining 50% of the coarse aggregates into the mixer.
 g. Add 50% of the mixing water followed by water reducing admixture and mix it for 30 seconds to produce partially wet concrete mix.
 h. Add set retarder to the partially wet concrete mix and run mixer for 30 seconds.
 i. Add remaining water to the wet concrete mix based on visual observation of the mix. If it is too wet, don not put the remaining water.
 j. Mix wet concrete mix for 3 minutes in a mixer.
 k. Let wet concrete mix sit in the mixer for 1 minute.
 l. Mix wet concrete mix for additional 1 minute.

Water Reducing Agents:

The concrete industry uses water reducing and high range water reducing agents such as polycarboxylates, lignosulfonates, organic water reducers to, among other things, improve the workability and flow of the mix with improved final cured properties while using lower water amounts. Exemplary water reducing agents include: MasterGlenium 1466, MasterGlenium 3030, MasterGlenium 3400, MasterGlenium 7500, MasterGlenium 7511, MasterGlenium 7700, MasterGlenium 7710, MasterGlenium 7920, MasterGlenium 7925 (BASF Chemicals); Eucon 1037, Eucon 37, Eucon 537, Eucon SP, Eucon SPJ, Plastol 5000, Plastol 5700, Plastol 6200EXT, Plastol 6400, Plastol 6425, Plastol SPC, Plastol Ultra 109, Plastol Ultra 209, Eucon X-15, Eucon X-20, Eucon MR, Eucon MRX, Plastol 341, Plastol 341 S, Plastol 6420 (Euclid Chemicals); and Sikament SPMN, Sikament-475, Sikament 610, Sikament 686, Sika Viscorete 1000, Sika Viscocrete 2100, Sika Viscorete 2110, Sika Viscorete 4100 and Sika Viscocrete 6100 (Sika Corporation).

Air Entraining Agents:

The concrete industry uses air entraining agents such as, vinsol-resin, wood based resins, alkyl ayrl sulfonates to improve performance and durability, such as but not limited to, resistance to deterioration from freeze-thaw cycles etc. Exemplary air entraining agents include: Eucon AEA-92S, Eucon AEA-92, Eucon Air 30, Eucon Air 40, Eucon Air MAC6, Eucon Air MAC 12, Eucon Air Mix 200, Eucon Air Mix 250, Eucon Air Mix (Euclid Chemicals); MasterAir AE 200, MasterAir AE 400, MasterAir AE90, MasterAir VR 10 (BASF Master Builders); and Sika AEA-14, Sika Air 260, Sika Air 360, Sika Air, Sika Multi Air 25 (Sika Corporation).

Set Retarders:

The concrete industry uses sucrose, glucose or sodium gluconate based agents. Exemplary set retarders include: MasterSet R100, MasterSet R 122, MasterSet R 300, MasterSet R 961 (BASF Master Builders); Eucon HC, Eucon LR, Eucon NR, Eucon Retarder 75, Eucon Retarder 100 (Euclid Chemicals); and Plastiment, Plastiment ES and Plastiment XR (Sika Corporation).

TABLE 1

Mixture proportions for Example 1 (in kg)

|  | Ex-1-Mix-1 | Ex-1-Mix-2 | Ex-1-Mix-3 | Ex-1-Mix-4 |
|---|---|---|---|---|
| Solidia Cement ™ | 11.49 | 15.53 | 15.51 | 15.51 |
| VCAS | 0.93 | 0 | 0 | 0 |
| OPC (Type I/II) | 3.10 | 0 | 0 | 1.72 |
| Fine limestone powder | 0 | 0 | 1.72 | 0 |
| Construction sand | 34.07 | 34.07 | 33.56 | 33.56 |
| ¼" aggregates | 21.76 | 21.76 | 21.64 | 21.64 |
| ⅜" aggregates | 18.11 | 18.11 | 18.02 | 18.02 |
| Total of Solids | 89.46 | 89.47 | 90.45 | 90.45 |
| Water reducer | 0.114 | 0.114 | .126 | .126 |
| Air entraining agent | 0.021 | 0.021 | 0.078 | 0.078 |
| Set retarder | 0.064 | 0.064 | .120 | .120 |
| Calcium nitrate | 0.310 | 0.310 | 0 | 0 |
| Tap water | 5.110 | 5.11 | 4.30 | 4.30 |
| Total of liquids | 5.62 | 5.62 | 4.625 | 4.625 |

Concrete cylindrical specimens (18) were cast with Solidia Concrete™ which was mixed in a pan mixer following the standard mixing procedure as per mixture proportions described earlier. The cylindrical concrete specimens (4"dia.×8" height) were put in an environmental chamber for 4 hours with mold at 70° C. and 50% relative humidity. The specimens were demolded and put in $CO_2$ curing chamber with more than 95% $CO_2$ concentration at ambient pressure and 70° C. for carbonation curing for 20 hours on day 1.

Six of the specimens from concrete batches in the carbonation chamber were removed after 20 hours of carbonation, six additional specimens were removed after 44 hours and the six specimens were removed after 65 hours of carbonation. The pH of $CO_2$-cured Solidia Concrete™ for 20, 44 and 65 hours, compressive strength and visual inspection with phenolphthalein indicator tests were evaluated.

The compressive strength for concrete was measured as per ASTM C39 after the specimens are cured for certain duration in carbonation chamber.

The procedure for pH measurement of green, uncured concrete was as follows.
1. First obtain the mortar fraction of concrete by vibrating a representative sample through the next sieve grade smaller than the nominal size of the smallest coarse aggregate. In the case of these batches, the No. 4 sieve is sufficient.
2. Fill a test tube just small enough that the pH probe will not fall into the tube with mortar to the level just where the probe can reach into the tube.
3. Add deionized water to about a centimeter above the mortar and mix thoroughly. Refill the tube with deionized water or mortar if the level falls below a centimeter above the mortar.
4. Let the sample settle 1 min. and take the pH measurement. Alternatively, the probe can be placed immediately into the test tube but some time must be allowed to let the reading stabilize.

The procedure for pH measurement of Solidia Concrete™ after carbonation in $CO_2$ curing chamber was as follows.
1. Take cylinder remains from compression testing and collect the debris. If the debris collected is only from a certain portion of the cylinder, break the cylinder with a sledgehammer until enough debris is collected to be sufficient for testing and representative.
2. Sieve the debris through a No. 30 sieve to obtain a sample. The sample will contain cementitious powder, siliceous material and fragments of coarse aggregate.
3. Fill a test tube just small enough that the pH probe will not fall into the tube with the sample to the level just where the probe can reach into the tube.
4. Add deionized water to about a centimeter above the sample and mix thoroughly. Refill the tube with deionized water if the level falls below a centimeter above the sample.
5. Let the sample settle 1 min. and take the pH measurement. Alternatively, the probe can be placed immediately into the test tube but some time must be allowed to let the reading stabilize.

The pH and compressive strengths of Mixes 1-4 were evaluated as a function of carbonation time, and the following data generated.

| | pH values after | | | | Compressive strength after (psi) | | |
|---|---|---|---|---|---|---|---|
| | 20 hr | 44 hr | 65 hr | | 20 hr | 44 hr | 65 hr |
| Ex-1-Mix-1 | 11.85 | 11.1 | 11.1 | Ex-1-Mix-1 | 5000 | 6800 | 8800 |
| Ex-1-Mix-2 | 11.85 | 9.7 | 9.4 | Ex-1-Mix-2 | 3300 | 7400 | 9200 |
| Ex-1-Mix-3 | 11.55 | 11 | 9.65 | Ex-1-Mix-3 | 2000 | 8500 | 10500 |
| Ex-1-Mix-4 | 12.3 | 12.1 | 12 | Ex-1-Mix-4 | 1000 | 3000 | 4800 |

FIGS. 12-15 illustrate two relationships for CSC concrete, the first between carbonation duration and pH (solid line) and the second between carbonation duration and compressive strength (dotted line). Each of the three data points from the table above appear on the pH and compressive strength curves of each Figure. The two curves demonstrate that the pH of Solidia Concrete can be manipulated by changing curing duration. It also can be manipulated by changing curing conditions in the carbonation chamber. Additionally, changes to the mixture compositions like type and quantity of cementitious materials can also be used as influencing parameters. The relationship between these curves provides the basis to ascertain desirable conditions for a concrete to achieve adequate strength as well as corrosion resistance (i.e., desired modified pore solution pH). Another factor is the cross-sectional thickness of the body being cured. Thicker members take longer for the curing to reach the center of the cross-section and provide adequate strength. Given the numerous factors at play, achieving all desired goals in the final carbonated material is a complex challenge.

Figure 12:
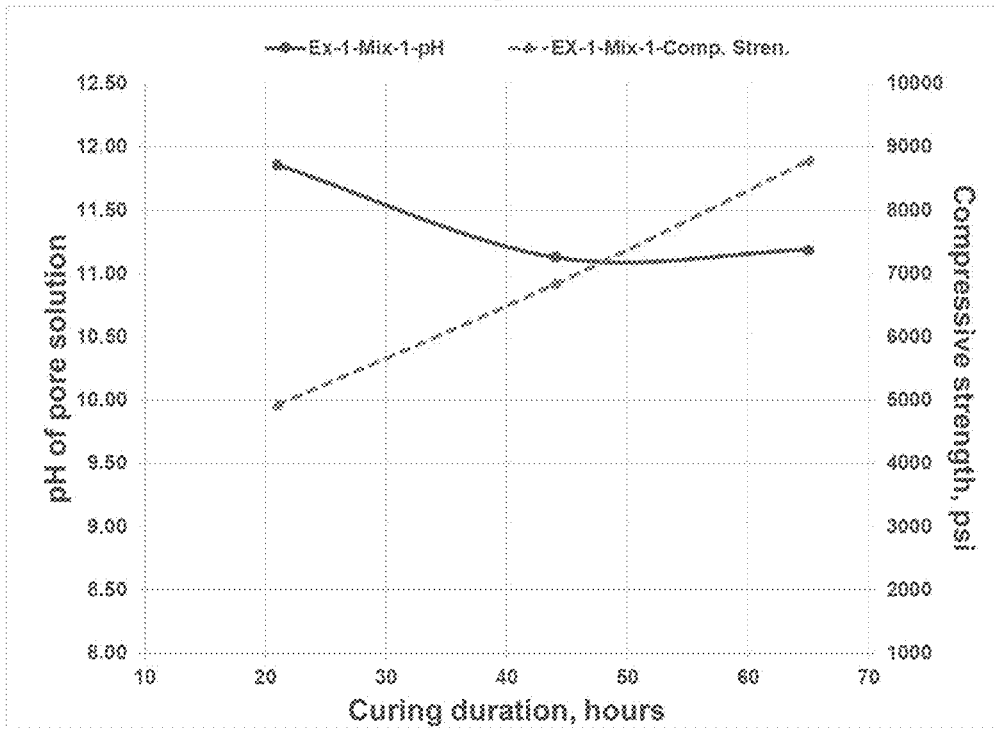
FIG. 12 is a plot of the pH-Compressive Strength-Duration Relationship for the carbonated concrete of Example 1—Mix 1.

For instance, FIG. 12 (Example 1, Mix 1) illustrates that if the objective is to maintain a pH of 11.5 or greater, the duration of curing should be on the order of 20-just over 30 hours. Curing for this length of time results in a compressive strength of approximately 5,000-6,000 psi.

Figure 13:
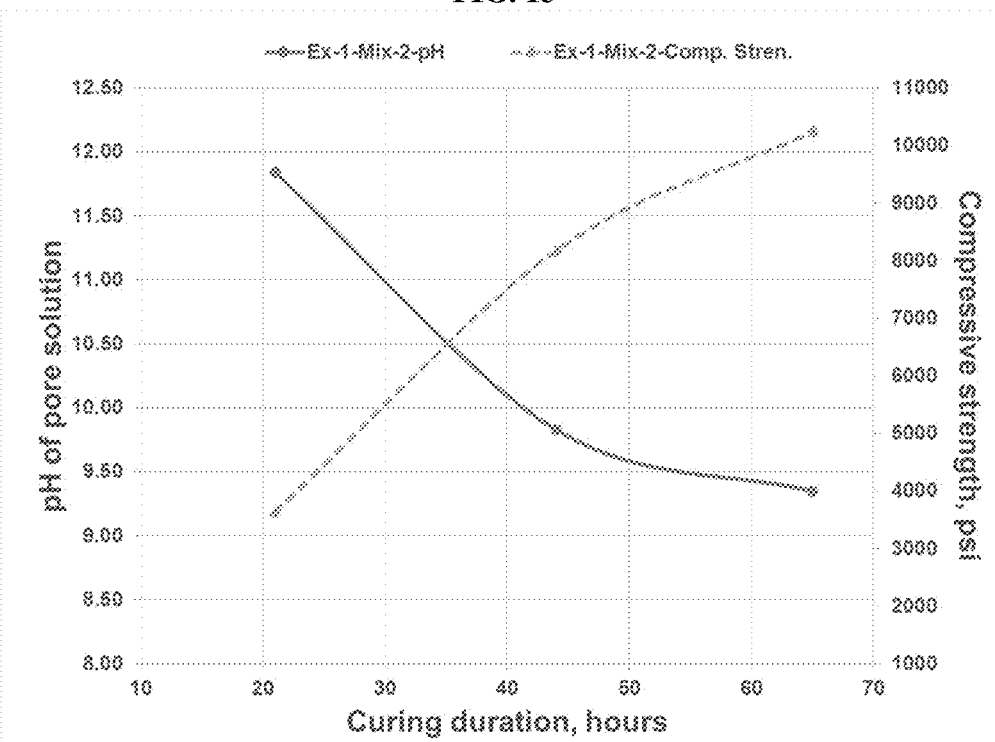
FIG. 13 is a plot of the pH-Compressive Strength-Duration Relationship for the carbonated concrete of Example 1—Mix 2.

FIG. 13 (Example 1, Mix 2) shows that if pH is to be maintained at 11.5 or greater, the duration of curing for this mix should be limited to approximately 20-25 hours. Curing for this length of time results in a compressive strength on the order of 4,000-5,000 psi.

Figure 14:
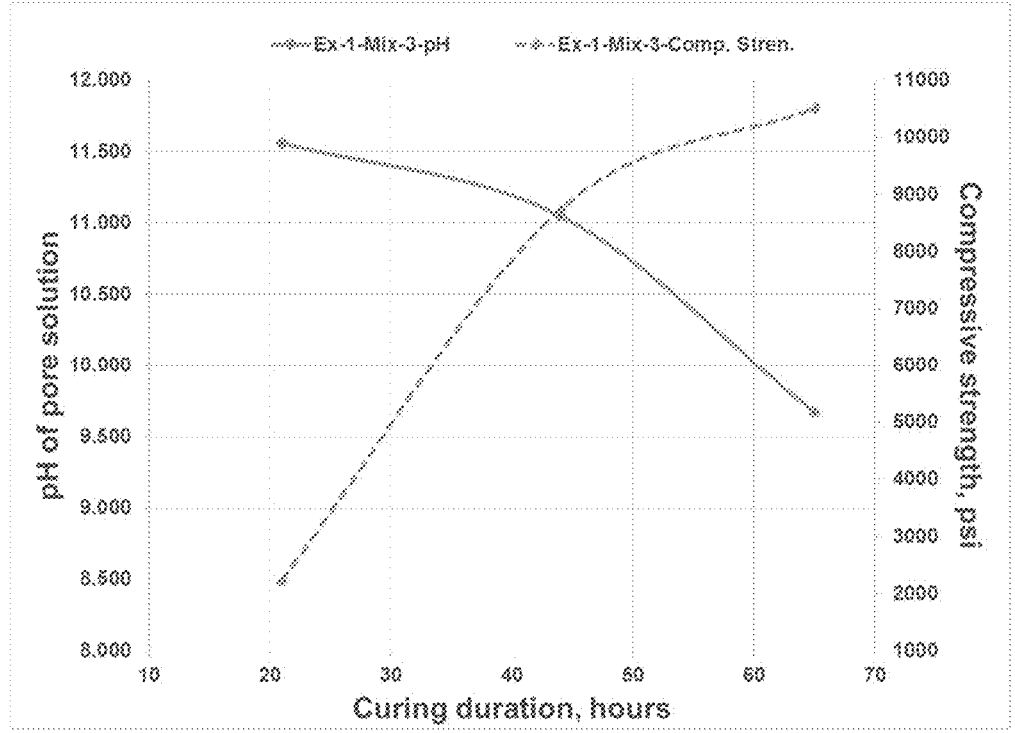
FIG. 14 is a plot of the pH-Compressive Strength-Duration Relationship for the carbonated concrete of Example 1—Mix 3.

In the example illustrated in FIG. 14 (Example 1, Mix 3), a pH of 11.5 or greater appears only initially, at a curing time of approximately 20 hours. The pH then decreases to a value below 11.5 with subsequent curing. The compressive strength attained through curing of this mix for approximate 20 hours is just above 2,000 psi.

Figure 15:
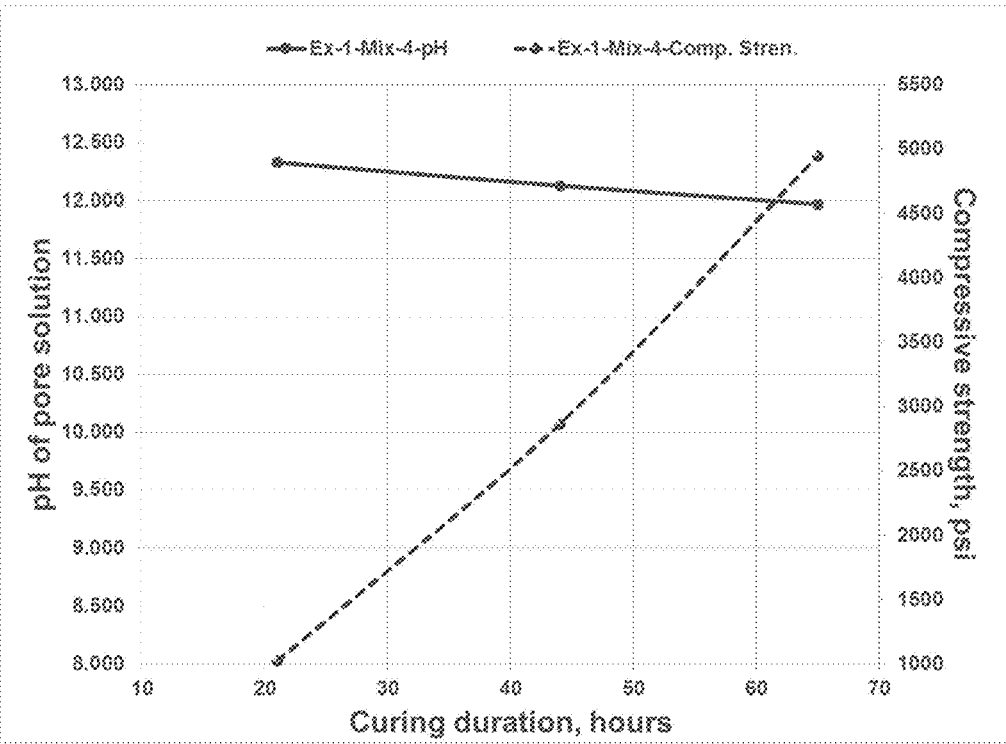
FIG. 15 is a plot of the pH-Compressive Strength-Duration Relationship for the carbonated concrete of Example 1—Mix 4.

In FIG. 15, it can be seen that this mix exhibited a pH value above 11.5 throughout the entire duration of curing (20-65 hours). However, a compressive strength of at least 3,500 psi was not achieved until a curing time of about 50 hours. When cured for approximately 50+-65 hours, pH was maintained at a value above 11.5 (even above 12.0), and a compressive strength for proximally 3,500-5,000 psi was achieved.

Example 2 Porosity, Sorptivity and Permeability Reduction

According to a second method to mitigate corrosion initiation for plain carbon steel reinforced CSC concrete, improved water resistance of the concrete delays the onset of corrosion initiation.

Solidia Concrete™ can be made with diverse mixture proportions based on the strength, durability and purpose for which concrete is used. The cement in combination with other filler materials like fly ash, slag, VCAS, limestone powder, also called as cementitious material, content for one cubic meter of Solidia Concrete™ can be between 250 and 500 kg, preferably between 350 and 450 kg. For one cubic meter of Solidia Concrete™, sand content is between 700 and 1000 kg, ¼" aggregate content is between 500 and 600 kg and ⅜" aggregate content between 400 and 550 kg. In addition to these solid materials, commercial water reducing, air entraining, and set retarding admixture at different dosage levels were used. The cementitious material included Solidia Cement™, which is a CSC cement, reactive filler materials like fly ash, slag, vitreous calcium alumino silicate (VCAS) and ordinary Portland cement (OPC), non-reactive filler materials like fine limestone powder, silica fume, glass powder. The water reducing agent can be between 3 to 12 ml/kg of cementitious content, the air entraining agent can be between 1 ml/kg to 7 ml/kg of cementitious content. The set retarding agent can be between 3 to 10 ml/kg and corrosion inhibiting agent can be added at a dosage level of between 10 to 30 ml/kg of cement content.

For Example 2, the actual amount of all ingredients used for 3 different types of concrete mixtures are shown in Table 2. Ex-2-Mix-1 is a control OPC mix and Ex-2-Mix-2 is a control Solidia Concrete™ mix with no filler material. Ex-2-Mix-3 is a modified Solidia Concrete™ in which Solidia Cement™ was replaced with 6% VCAS by mass. Although, the cement replacement can be between 3% to 8% with VCAS or other proportions of different materials both reactive or non-reactive filler materials.

Low CSC based concrete was produced with low CSC based cement in a pan mixer following the standard mixing procedure as per mixture proportions discussed above. The cylindrical concrete specimens (4"×8") were put in an environmental chamber for 4 hours with mold at 70° C. and 50% RH. The specimens were demolded and put in a $CO_2$ curing chamber with more than 95% $CO_2$ concentration at ambient pressure and 70° C. for carbonation curing for 20 hours on day 1.

One-third of the specimens from concrete batches in the carbonation chamber were removed after 20 hours of carbonation, the next third after 44 hours and the remaining specimens after 65 hours of carbonation. The pH of reacted concrete for 20 hours, compressive strength and visual inspection with phenolphthalein indicator tests were performed. In this procedure, 1g of phenolphthalein solution is mixed with 70 ml ethyl alcohol and subsequently diluted to 100 ml by adding deionized water. This solution which is called phenolphthalein indicator is sprayed on to the freshly cut, washed and air dried concrete surface. Pink color indicate partially carbonated or non-carbonated region. Fully carbonated area shows no pink color. Visual inspection involved checking of any loose materials falling of the concrete surface which is an indication of weaker or poorly reacted surface.

TABLE 2

Mixture proportions for Example 2 (in kg)

| Ingredients | Ex-2-Mix-1 | Ex-2-Mix-2 | Ex-2-Mix-3 |
|---|---|---|---|
| Solidia Cement ™ | 0 | 13.97 | 13.06 |
| VCAS | 0 | 0 | 0.83 |
| OPC (Type I/II) | 14.27 | 0 | 0 |
| Construction sand | 29.87 | 30.64 | 30.48 |
| ¼" aggregate | 19.22 | 19.58 | 19.48 |
| ⅜" aggregate | 16.01 | 16.29 | 16.21 |
| Total of Solid Components | 79.37 | 80.48 | 80.06 |
| Tap water | 5.37 | 4.35 | 4.74 |
| Glenium7500 | 0.074 | 0.073 | 0.102 |
| MBAE 90 | 0 | 0.063 | 0.063 |
| Sika Plastiment | 0 | 0.097 | 0.097 |
| Total of Liquid Components | 5.444 | 4.583 | 5.002 |
| Total of Solid and Liquid | 84.814 | 85.063 | 85.062 |

Figure 16:
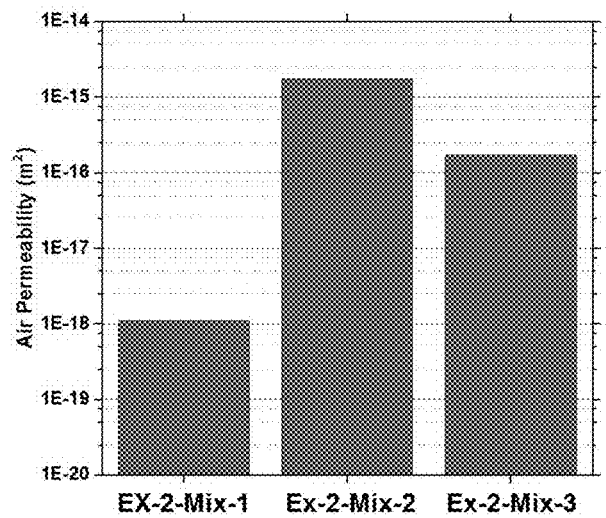
FIG. 16 is a plot of air permeability for the concretes of Example 2, mixes 1-3.
Figure 17:
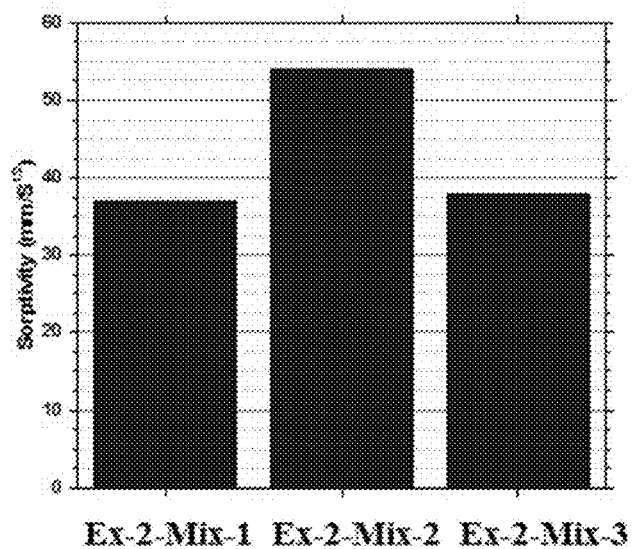
FIG. 17 is a plot of sorptivity for the concretes of Example 2, mixes 1-3.
Figure 18:
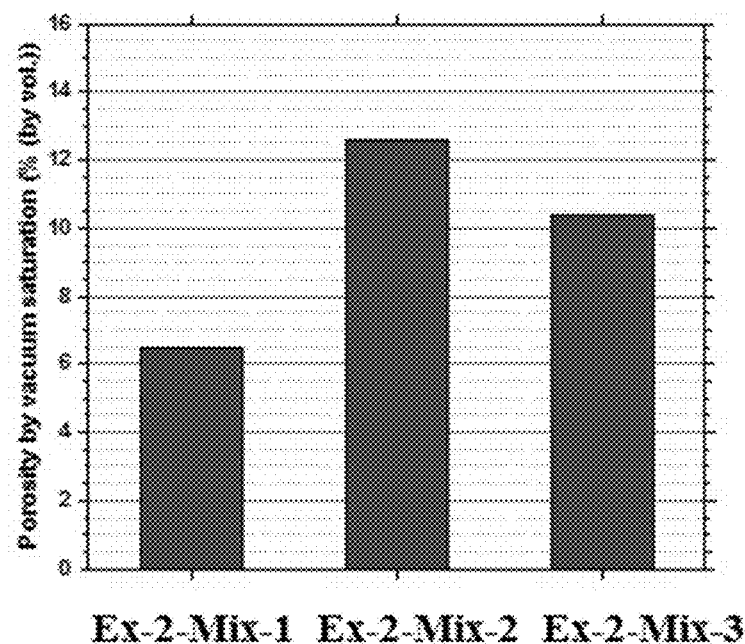
FIG. 18 is a plot of porosity for the concretes of Example 2, mixes 1-3.

The filler materials were used to improve water resistance can be Class C or Class F fly ash, ground granulated blast furnace slag (GGBFS), fine glass powder, VCAS, silica fume, limestone powder and combination thereof. Single component addition like VCAS, Class C fly ash, Silica fume, GGBFS were evaluated in CSC concrete. Table 2 shows one such mixture with VCAS (Ex-2-Mix-3). Water ingress optimized for CSC concrete through addition of VCAS is seen in FIGS. 16-18 as air permeability, sorptivity and porosity was reduced as compared to CSC concrete (Ex-2-Mix-2). FIGS. 16-18 also show air permeability, sorptivity and porosity values for Ex-2-Mix-1 which is a reference OPC concrete. Water transport, which is essential for improving durability of concrete structure, can be modified in Solidia Concrete by addition of different kinds of filler materials (reactive as well as non-reactive). The filler materials typically fill the small pores between the cement particles and improves the overall packing of the solids in the concrete mix. This results in lower porosity and permeability as well as higher tortuosity. These are desired properties to reduce any ingress of moisture or chemicals like salts which influences the corrosion of steel.

Example 3. Process for Producing High pH CSC Concrete with Addition of Different Chemicals after Curing In a third method, high pH CSC concrete is developed by increasing the pH of low pH low CSC based concrete, post carbonation.

Solidia Concrete™ can be made with diverse mixture proportions based on the strength, durability and purpose for which concrete is used. The cementitious materials content for Solidia Concrete™ can be between 250 and 500 kg/m³, preferably between 350 and 450 kg/m³, sand content between 700 and 1000 kg/m³, "aggregate of between 500 and 600 kg/m³ and ⅜" aggregate between 400 and 550 kg/m³ can be used. In addition to these solid materials, commercial water reducing, air entraining, and set retarding agents, at different dosage levels, were used. The cementitious material included Solidia Cement™, which is low calcium silicate based carbonatable cement, reactive filler materials like fly ash, slag, vitreous calcium alumino silicate (VCAS) and ordinary Portland cement (OPC), non-reactive filler materials like fine limestone powder, silica fume, glass powder. The water reducing agent can be between 3 to 12 ml/kg of cementitious content, the air entraining agent can be between 1 ml/kg to 7 ml/kg of cementitious content. The set retarding agent can be between 3 to 10 ml/kg and corrosion inhibiting agent can be added at a dosage level of between 10 to 30 ml/kg of cement content.

For Example 3, the actual amount of all ingredients used for 4 different types of Solidia Concrete mixtures is shown in Table 1.

18 low CSC based concrete cylindrical specimens were produced with CSC cement in a pan mixer following the standard mixing procedure as per mixture proportions shown in Table 1. The cylindrical concrete specimens (4"dia.×8" height) were put in an environmental chamber for 4 hours with mold at 70° C. and 50% RH. The specimens were demolded and put in an autoclave at ambient pressure and 70° C. and 50% relative humidity for carbonation curing for 65 hours.

Figure 19:
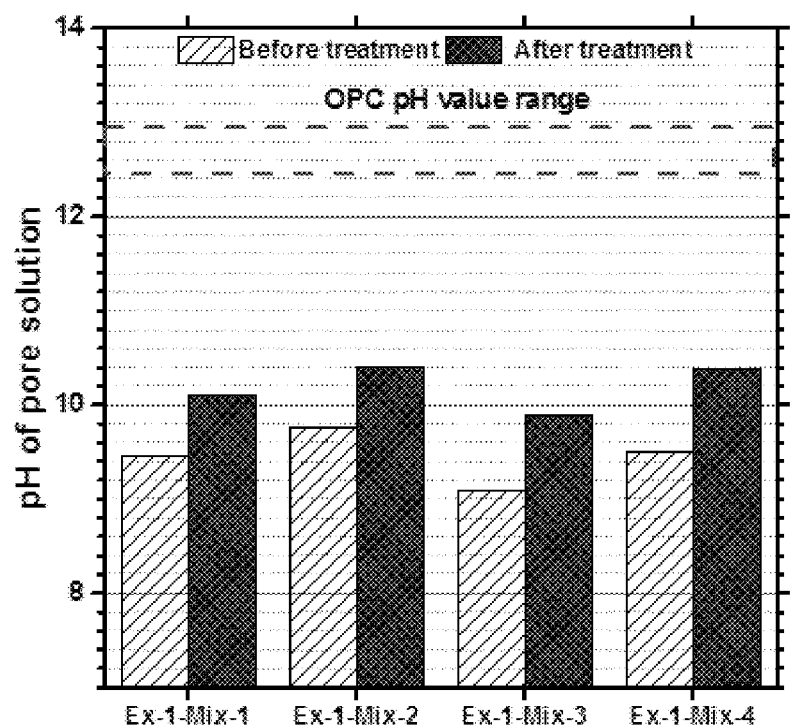
FIG. 19 is a plot of the pH of solution in CSC concrete of Example 1, mixes 1-4, before and after the treatment.

Low CSC based concrete cylindrical specimens was soaked in saturated limewater for 2 weeks to increase the pH of a pore solution contained therein. FIG. 19 shows a pH of 4 types of CSC concrete specimens before and after soaking in saturated limewater for two weeks. It can be clearly seen that pH of reacted CSC concrete increased irrespective of its initial pH or composition but it is still much less as compared to pH of conventional OPC concrete. Corrosion initiation which is measured in terms of half-cell potential in these concretes was delayed by about 2 weeks as compared to control low CSC based concrete without any treatment.

Ex-1-Mix-2 was used to produce ASTM G109 specimens with plain carbon steel rebar to evaluate the performance of after post carbonation treatment with a basic solution, to increase the pore solution pH.

In the ASTM G109 specimens, the top layer of the prismatic specimen consists of one reinforcing bar with a 0.75 in. (19 mm) concrete cover and the bottom layer consists of two bars. The two layers of reinforcement are electrically connected with a 100-ohm resistor. The prismatic specimens were ponded with a 3% (by wt.) sodium chloride solution for 4 days and kept dry for 3 days; these cycles were continued until a predefined amount of charge was measured between the top and bottom reinforcing bars. The macrocell corrosion current and the half-cell potential (HCP) values (versus copper-copper sulfate electrode [CSE]) of the bars were monitored.

For the evaluation of the post carbonation treatment, a 1M KOH solution was used and the ASTM G109 specimen was soaked in this solution for 3 weeks. A control sample was also included, which was not exposed to the post carbonation treatment of soaking in 1M KOH solution. Both samples were subjected to the exposure as noted above.

Figure 20:
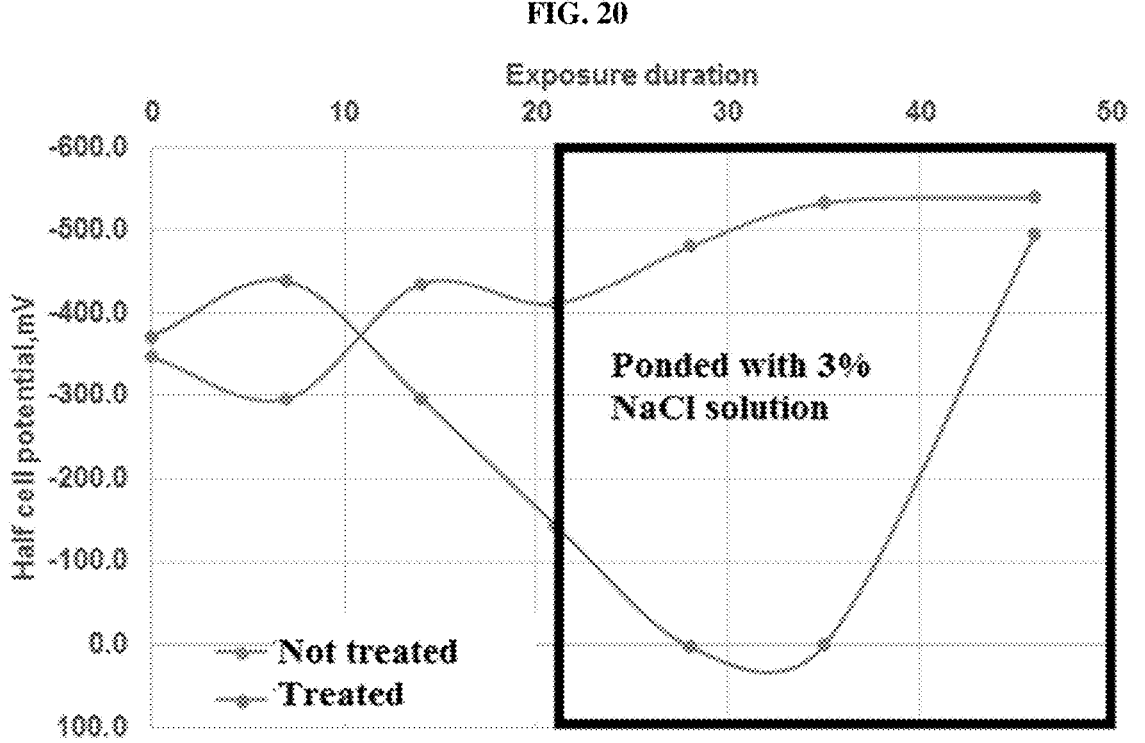
FIG. 20 is a plot of the half-cell potential values for ASTM G 109 specimens treated and not treated with 1M KOH, before ponding with salt solution, and after ponding with salt solution.

FIG. 20 shows exemplary half-cell potential values for ASTM G 109 specimens treated and not treated with 1M KOH before ponding with salt solution and after ponding with salt solution. Corrosion initiation in these concretes was delayed by about 2 weeks as compared to control CSC concrete without any treatment.

Example 4. Process for Producing High pH Low Calcium Silicate Cement Based Concrete with Addition of Different Chemicals (Before Curing in $CO_2$ Curing Chamber)

In the fourth method, pore solution pH of cured Solidia Concrete™ is increased by addition of high pH imparting additives to the low CSC based concrete mixture during the mixing process. Examples of high pH imparting additives are calcium nitrate tetrahydrate, calcium nitrite, NaOH, sodium bicarbonate, OPC, sodium silicate, deadburned CaO, deadburned MgO, high alkalinity concrete recycled material (CRM), slag aggregate, and combinations thereof.

Two such type of mixtures (Ex-4-Mix-2 and Ex-4-Mix-3) are shown in Table 3 with the mixture proportions used for producing cylindrical and ASTM G109 specimens. Ex-4-Mix-1 is an example of a control Solidia Concrete™ mixture with total cementitious material content of 416 kg per cubic meter of concrete, sand content of 913 kg, ¼" aggregate of 583 kg and ⅜" aggregate of 485 kg per cubic meter of concrete. Ex-4-Mix-2 is a mix design with 10% of the CSC cement replaced with OPC, as cement replacement, with total cementitious content of 450 kg per cubic meter of concrete. Ex-4-Mix-3 is a modified Solidia Concrete™ in which Solidia Cement™ was replaced with 6% of VCAS and 20% of OPC by mass and calcium nitrate tetrahydrate was added to the mix at 30 ml/kg by weight of cement content. However, within the scope of this disclosure, the cement replacement can be between 1% and 10% with VCAS and between 5 and 25% with OPC or other proportions of different materials both reactive or non-reactive filler materials.

Six cylindrical concrete specimens (4"×8"), 3 ASTM G109 specimens (4.5"×6"×11") with embedded plain carbon steel and 3 freeze thaw specimens (3"×4"×16") were produced for each mix. These specimens were put in an environmental chamber for 4 hours with mold at 70° C. and 50% RH. The specimens were demolded and put a $CO_2$ curing chamber at ambient pressure and more than 95% $CO_2$ concentration at 70° C. and 50% relative humidity for carbonation curing for 65 hours.

Four of the cylindrical specimens from concrete batches in the carbonation chamber were removed after 65 hours of carbonation. These cylindrical specimens were tested for compression, pH measurement and visual inspection by cutting 1 cylinder into two parts and spraying with phenolphthalein indicator to estimate pH after each curing duration. Ex-4-Mix-1, Ex-4-Mix-2, and Ex-4-Mix-3 had pH of 9.50, 10.60 and 10.65, respectively.

TABLE 3

| Mixture proportions (in kg) for Example 4 | | | |
|---|---|---|---|
| Ingredients | Ex-4-Mix-1 | Ex-4-Mix-2 | Ex-4-Mix-3 |
| Solidia Cement ™ | 14.71 | 15.51 | 11.49 |
| VCAS | 0 | 0 | 0.93 |
| OPC (Type I/II) | 0 | 1.72 | 3.10 |
| Construction sand | 32.27 | 32.11 | 34.07 |
| ¼" aggregate | 20.61 | 21.64 | 21.76 |
| ⅜" aggregate | 17.16 | 18.02 | 18.11 |
| Total of Solid Components | 84.75 | 89.00 | 89.46 |
| Tap water | 5.50 | 5.75 | 5.11 |
| Glenium7500 | 0.108 | 0.126 | 0.114 |
| MBAE 90 | 0.066 | 0.078 | 0.021 |
| Sika Plastiment | 0.103 | 0.120 | 0.064 |
| Calcium nitrate tetrahydrate | 0 | 0 | 0.310 |
| Total of Liquid Components | 5.777 | 6.074 | 5.619 |
| Total of Solid and Liquid | 90.527 | 95.074 | 95.079 |

The compressive strength for concrete was measured as per ASTM C39 after the specimens are cured for certain duration in carbonation chamber. Ex-4-Mix-1, Ex-4-Mix-2, and Ex-4-Mix-3 had strengths of 8620 psi, 7020 psi and 6533 psi, respectively.

Three ASTM G109 specimens were used for each corrosion test.

The measured HCP values on corrosion specimens were more than −350 mV for both top and bottom rebar, which indicated much higher level of corrosion activity in plain carbon steel reinforcement.

Figure 21:
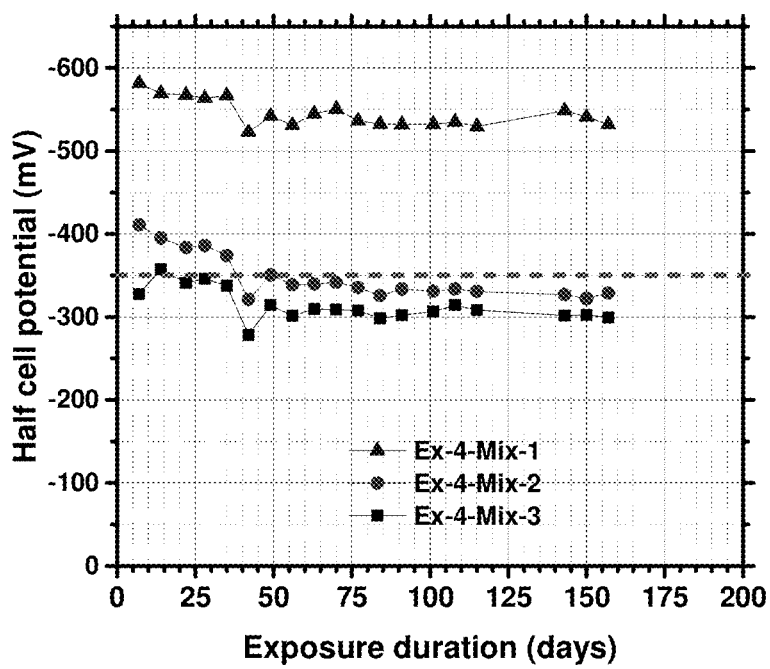
FIG. 21 is a plot of half-cell potential values over time for the concretes of Example 4, mixes 1-3, after exposure to freshwater.
Figure 22:
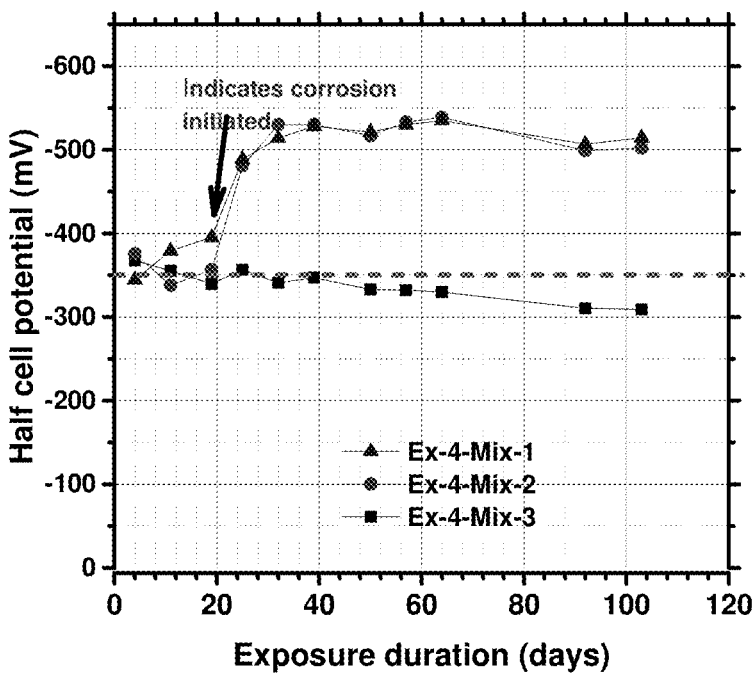
FIG. 22 is a plot of half-cell potential values over time for the concretes of Example 4, mixes 1-3, after exposure to salt water.

FIG. 21 shows HCP values for specimens exposed to fresh water while FIG. 22 shows HCP values for the specimens exposed to salt water. It can be seen from FIG. 20 that both high pH CSC concrete mixtures exhibit HCP values more negative than −350 mV indicating possibility of no corrosion initiation even after 145 days of total exposure duration to fresh water. From FIG. 20, it can be seen that low-pH CSC concrete exhibits HCP values less negative than −500 mV from the first week of exposure indicating corrosion imitation.

Similarly, it can be seen from FIG. 22 that high-pH CSC concrete (Ex-5-Mix-3) exhibits HCP values of more negative than −350 mV indicating no corrosion initiation even after 63 days of total exposure to salt water solution under W/D cycles while high pH mix 2 was good only for 21 days. This indicates high-pH CSC concrete studied here exhibits good performance in both fresh water as well as salt water up to 145 days and 60 days respectively.

Figure 23:
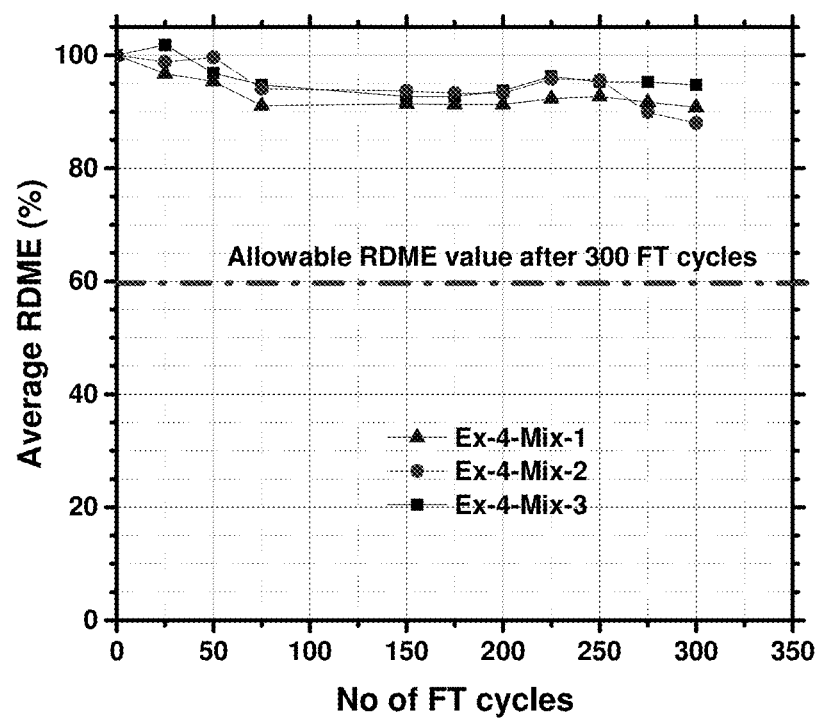
FIG. 23 is a plot of relative dynamic modulus of elasticity for specimens from the concretes of Example 4, mixes 1-3.

Example 4A. Freeze-Thaw Durability of Low-pH Low CSC Based Concrete and High pH Low CSC Based Concrete The freeze thaw (FT) durability of low CSC based concrete (low pH) and modified CSC concrete (high pH) was evaluated as per ASTM C666 procedure for samples produced with mix design noted in Table 3. FIG. 23 shows the average value of relative dynamic modulus of elasticity for CSC concrete after exposure to 300 FT cycles. This test was performed to evaluate the suitability of the low-pH low CSC based concrete and high pH low CSC based concrete mixtures (higher pH values) for cold weather conditions in addition to corrosion resistance for embedded plain carbon steel reinforcement.

It can be seen from FIG. 22 that both low-pH low CSC based concrete and high pH low CSC based concrete mixtures survived 300 FT cycles successfully as the RDME values all CSC concrete tested is more than 90%. This is far better than the minimum value (60%) as recommended by ASTM C666. This indicates that the modifications made in high pH low CSC based concrete to enhance corrosion resistance did not negatively affect the freeze thaw durability.

Upon visual inspection of 3"×4"×16" concrete specimens made with different types of CSC concrete, and exposed to 150 and 300 freeze thaw cycles, no visible scaling for modified CSC concrete was observed after 300 FT cycles. Thus, it can be concluded that high pH low CSC concrete exhibits excellent performance in freeze thaw test in comparison with low-pH CSC concrete which also meets ASTM C666 specifications but shows some scaling of concrete from the surface.

Example 5. Increasing pH of Low CSC Based Concrete by Reducing Concentration of Carbon Dioxide Gas in $CO_2$ Curing Chamber In a fifth proposed method, the pH of reacted concrete can be maintained at higher levels by maintaining the concentration of carbon dioxide in the $CO_2$ curing chamber to a range between 10% and 95%).

In example 5, Ex-5-Mix-1 is a control Solidia Concrete™ mixture with no filler material, Ex-5-Mix-2 with 20% OPC as a cement replacement with total cementitious content of 415 kg per cubic meter of concrete. Although, the cement replacement can be between 1% to 30% with OPC and or other proportions of different materials both reactive or non-reactive filler materials. In this example, concrete curing in carbonation chamber was performed at 60% $CO_2$ concentration for 20 hours and 40 hours after initial preconditioning in relative humidity chamber at 60° C. in air at 60% relative humidity. In some embodiments, the water reducing agent can be between 3 to 12 ml/kg of cementitious material, the air entraining agent can be between 1 ml/kg to 7 ml/kg of cementitious material. The set retarding agent can be between 3 to 10 ml/kg of cementitious material.

For Example 5, the actual amount of all the ingredients used is shown in Table 4. Two different levels of $CO_2$ (60% and 80%) concentrations are used in this example for carbonation curing of Solidia Concrete™, although the concentration can be between 45 and 100 percent.

Low CSC concrete was produced with low CSC in a pan mixer following the standard mixing procedure as per mixture proportions. The cylindrical concrete specimens (4"×8") were put in an environmental chamber for 3 hours with mold at 60° C. and 60% RH. The specimens were demolded and put in an autoclave at ambient pressure and 60° C. and 60% relative humidity at 80% $CO_2$ concentration for carbonation curing for 65 hours.

Six cylindrical specimens from both concrete batches in the carbonation chamber were removed after 65 hours of carbonation for compressive strength testing, pH measurement and visual inspection.

TABLE 4

Concrete mixture proportions for Example 5 (in kg)

| Ingredients | Ex-5-Mix-1 | Ex-5-Mix-2 |
|---|---|---|
| Solidia Cement ™ | 15.53 | 12.42 |
| OPC (Type I/II) | 0 | 3.10 |
| Construction sand | 34.07 | 34.07 |
| ¼" aggregate | 21.76 | 21.76 |
| ⅜" aggregate | 18.11 | 18.11 |
| Total of Solid Components | 89.47 | 89.46 |
| Tap water | 5.42 | 5.42 |
| Glenium 7500 | 0.114 | 0.114 |
| MBAE 90 | 0.042 | .042 |
| Sika Plastiment | 0.064 | .064 |
| Total of Liquid Components | 5.640 | 5.640 |
| Total of Solid and Liquid | 95.1 | 95.1 |

Figure 24:
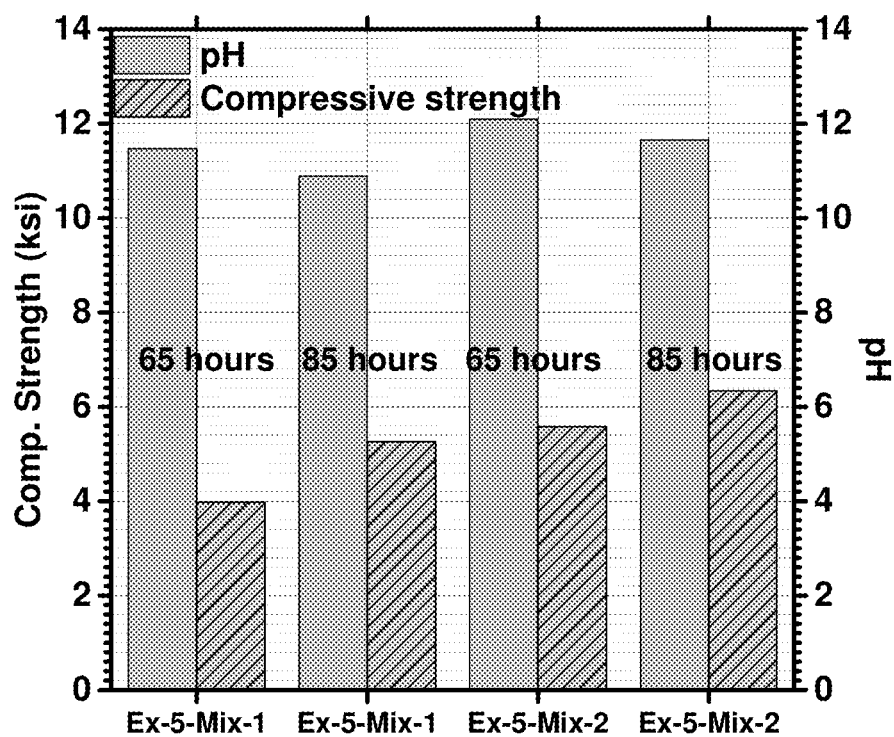
FIG. 24 is a plot of average pH values and compressive strength for the concretes of Example 5, mixes 1-2.
Figure 25:
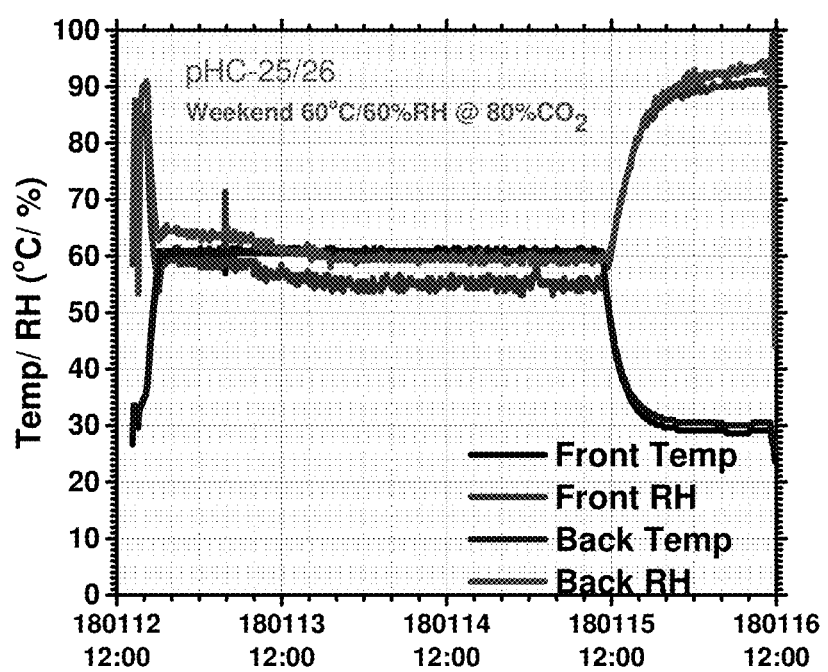
FIG. 25 is a plot of curing conditions for Example 5, mixes 1-2.

The compressive strength for concrete was measured as per ASTM C39 after the specimens were cured for 65 hours at 60° C. and 60% RH at lower $CO_2$ concentration in carbonation chamber. As discussed earlier, pH of reacted CSC concrete was measured. The compressive strength and pH values are shown in FIG. 24 for two Solidia Concrete™ mixtures cured for 65 hours at two different levels of $CO_2$ concentration (60% and 80%). It can be clearly seen from FIG. 24 that Ex-5-Mix-1 attains higher compressive strength at 60% $CO_2$ concentration as compared to 80% $CO_2$ concentration. However, for Ex-5-Mix-2 higher compressive strength is obtained at 80% $CO_2$ concentration level. Thus, addition of OPC in the mix design is seen to impact the strength development at a given concentration of $CO_2$. It can be seen from FIG. 24 that the measured pore solution pH for these concretes exhibit values about 11.30 or more at which plain carbon steel will remain in passive condition (which means no corrosion activity will commence). FIG. 25 shows curing conditions for mixes 1-2 of Example 5.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

Other embodiments within the scope of the claims herein will be apparent to one skilled in the art from consideration of the specification or practice of the disclosure as disclosed herein. It is intended that the specification be considered exemplary only, with the scope and spirit being indicated by the claims.

In view of the above, it will be seen that the several advantages are achieved and other advantages attained.

As various changes could be made in the above methods and compositions without departing from the scope of the disclosure, it is intended that all matter contained in the above description shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Any numbers expressing quantities of ingredients, constituents, reaction conditions, and so forth used in the application are to be understood as being modified in all instances by the term "about." Notwithstanding that the numerical ranges and parameters setting forth, the broad scope of the subject matter presented herein are approximations, the numerical values set forth are indicated as precisely as possible. Any numerical value, however, may inherently contain certain errors or inaccuracies as evident, for example, from the standard deviation found in their respective measurement techniques. None of the features recited herein should be interpreted as invoking 35 U.S.C. § 112, 6, unless the term "means" is explicitly used.

We claim:

1. A carbonated composite material, comprising
   a bonding matrix comprising a plurality of bonding elements; and
   a plurality of pores comprising a pore solution having a pH greater than about 9.5,
   wherein each bonding element comprises
   a core, wherein the core comprises of a carbonatable material,
   a first silica-rich layer that at least partially covers some peripheral portion of the core, and
   a second calcium and/or magnesium carbonate-rich layer that at least partially covers some peripheral portion of the first silica-rich layer; and
   wherein the carbonated composite material has a compressive strength of 3,500 psi or greater.

2. The carbonated composite material of claim 1, wherein the pore solution has a pH of about 10 to about 13.5.

3. The carbonated composite material of claim 2, wherein the carbonated composite material has a compressive strength of 4,000 psi or greater.

4. The carbonated composite material of claim 2, wherein the carbonated composite material has a compressive strength of 5,000 psi or greater.

5. The carbonated composite material of claim 1, wherein the material has a compressive strength greater than about 7,000 psi.

6. The carbonated composite material of claim 4, wherein the material has a compressive strength greater than about 10,000 psi.

7. The carbonated composite material of claim 1, wherein the bonding matrix further comprises one or more pH enhancing additives.

8. The carbonated composite material of claim 7, wherein the one or more pH enhancing additives is selected from the group consisting of calcium nitrate tetrahydrate, calcium nitrite, NaOH, sodium bicarbonate, OPC, sodium silicate, high alkalinity concrete recycled material, slag aggregate, deadburned CaO, deadburned MgO, and combinations thereof.

9. The carbonated composite material of claim 1, wherein the porous body further comprises one or more additives to improve water resistance.

10. The carbonated composite material of claim 9, wherein the one or more additives to improve water resistance is selected from the group consisting of Class C fly ash, Class F fly ash, ground granulated blast furnace slag (GGBFS), fine glass powder, vitreous calcium aluminosilicate, silica fume, limestone powder, and combination thereof.

11. The carbonated composite material of claim 1, wherein the porous body further comprises one or more water reducing additives, air entraining additives, set retarders, and combinations thereof.

12. A concrete object comprising the carbonated composite material of claim 1 further comprising one or more iron or steel components at least partially embedded therein.

13. The concrete object of claim 12, wherein the one or more iron or steel components is made of plain carbon steel, epoxy coated steel, galvanized steel, and/or stainless steel.

14. The concrete object of claim 12, wherein the one or more iron or steel components is a reinforcement bar or mesh.

15. The carbonated composite material of claim 1, wherein the pore solution has a pH greater than about 10.

16. The carbonated composite material of claim 1, wherein the compressive strength is greater than about 7,000 psi.

* * * * *